US011776207B2

(12) United States Patent
Takahashi et al.

(10) Patent No.: US 11,776,207 B2
(45) Date of Patent: Oct. 3, 2023

(54) THREE-DIMENSIONAL SHAPE DATA PROCESSING APPARATUS AND NON-TRANSITORY COMPUTER READABLE MEDIUM

(71) Applicant: FUJIFILM Business Innovation Corp., Tokyo (JP)

(72) Inventors: Tomonari Takahashi, Kanagawa (JP); Yasuyuki Tanaka, Kanagawa (JP); Ryosuke Higashikata, Kanagawa (JP); Naoki Hiji, Kanagawa (JP); Taro Yokose, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/168,188

(22) Filed: Feb. 5, 2021

(65) Prior Publication Data

US 2022/0068021 A1 Mar. 3, 2022

(30) Foreign Application Priority Data

Sep. 1, 2020 (JP) ................................. 2020-147070

(51) Int. Cl.
*G06T 17/10* (2006.01)
(52) U.S. Cl.
CPC ..................................... *G06T 17/10* (2013.01)
(58) Field of Classification Search
None
See application file for complete search history.

(56) References Cited

U.S. PATENT DOCUMENTS

| 9,600,929 B1 | 3/2017 | Young et al. | |
| 9,754,405 B1 | 9/2017 | Young et al. | |
| 11,030,820 B1 * | 6/2021 | Inversin | G06F 3/017 |
| 2003/0081833 A1 * | 5/2003 | Tilton | G06V 10/267 |
| | | | 382/173 |
| 2005/0075847 A1 * | 4/2005 | Yamada | G06T 17/005 |
| | | | 703/2 |

FOREIGN PATENT DOCUMENTS

| JP | 2012088771 | 5/2012 | |
| WO | WO-2020246993 A1 * | 12/2020 | B22F 10/20 |

OTHER PUBLICATIONS

Masala, Giovanni Luca, Bruno Golosio, and Piernicola Oliva. "An improved Marching Cube algorithm for 3D data segmentation." Computer Physics Communications 184.3 (2013): 777-782. (Year: 2013).*

* cited by examiner

*Primary Examiner* — Nurun Flora
(74) *Attorney, Agent, or Firm* — JCIPRNET

(57) ABSTRACT

A three-dimensional shape data processing apparatus includes a processor configured to divide a three-dimensional space including a three-dimensional shape constituted by one or more forming surfaces, which are flat surfaces or curved surfaces or include both flat surfaces and curved surfaces, into plural three-dimensional regions each having a predetermined size, specify, for each of the three-dimensional regions, one or more of the forming surfaces that interfere(s) with the three-dimensional region, and redivide each of the three-dimensional regions until a size of the three-dimensional region reaches a size necessary for reproduction of a property of a portion of the three-dimensional shape expressed by one or more of the forming surfaces that interfere(s) with the three-dimensional region.

13 Claims, 13 Drawing Sheets

THREE-DIMENSIONAL SHAPE DATA PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-147070 filed Sep. 1, 2020.

BACKGROUND

(i) Technical Field

The present disclosure relates to a three-dimensional shape data processing apparatus and a non-transitory computer readable medium.

(ii) Related Art

Japanese Unexamined Patent Application Publication No. 2012-88771 discloses a method for forming a three-dimensional model of a photographed subject by stacking slice data of a taken image containing voxels of different sizes, including a first step of dividing the slice data of the taken image into plural regions each including a predetermined number of pixels, a second step of, in a case where all pixels included in a single region express a structure or a substance having the same characteristic, combining the pixels into a single piece of voxel data, a third step of, in a case where a single region includes pixels that express structures or substances having different characteristics, defining pixel data in the single region as mixture voxel data, a fourth step of acquiring slice data including voxel data and mixture voxel data by repeating the second step and the third step, and a fifth step of stacking plural pieces of slice data acquired by the fourth step in multiple stages.

U.S. Pat. No. 9,600,929 discloses an information processing apparatus that generates a difference model between plural three-dimensional shapes by dividing the whole three-dimensional shapes initially at a low resolution so that the numbers of divided regions in length, width, and height directions become equal to narrow down a region that needs processing at a high resolution.

U.S. Pat. No. 9,754,405 discloses an information processing apparatus that expresses a data structure of a three-dimensional shape as a $N^3$ tree structure obtained by dividing the three-dimensional shape so that the numbers of divided regions in length, width, and height directions are equal, top node and middle nodes of the $N^3$ tree structure each having index bits representing a pointer to a memory location where data in respective levels are stored and occupancy bits that indicate the presence or absence of subcubes in next levels.

SUMMARY

In some cases, processing concerning a three-dimensional shape of an object is performed for each of three-dimensional regions obtained by dividing a three-dimensional space including the object.

For example, a three-dimensional space is desirably divided into as small three-dimensional regions as possible in order to define detailed properties of an object by associating a property of the object with each of the three-dimensional regions. However, this increases the number of three-dimensional regions, resulting in an increase in data size of data used for processing and an increase in processing time.

In view of this, an octree is sometimes used to divide a three-dimensional space so that a size of a three-dimensional region farther from an inner part of an object and closer to a surface of the object becomes smaller.

For example, in a case where a surface of an object is a flat surface, a property of this range may be sometimes associated with a single three-dimensional region. However, in a case where an octree is used to divide a three-dimensional space, the surface of the object is divided into smallest three-dimensional regions of the octree, and as a result, the flat surface of the object is divided into plural three-dimensional regions. Furthermore, in a case where an octree is used to divide a three-dimensional space, even adjacent three-dimensional regions sometimes belong to subtrees of different parents (branch points). In this case, in order to select the adjacent three-dimensional regions, it is necessary to track a tree structure down to a parent common to the adjacent three-dimensional regions or calculate in which subtree each of the three-dimensional regions is located. Furthermore, in a case where an octree is used to divide a three-dimensional space, the three-dimensional space is divided into three-dimensional regions of a larger number of sizes as a size of an object becomes larger. Accordingly, even in a case where processing concerning a three-dimensional shape of an object can be performed by using three-dimensional regions of about three kinds of sizes (e.g., coarse, medium, and fine), the three-dimensional space is sometimes divided into three-dimensional regions of more than three kinds of sizes depending on a size of the object. Furthermore, in a case where a three-dimensional shape of an object is changed, it is necessary to redo division for not only three-dimensional regions corresponding to a changed portion, but also other three-dimensional regions corresponding to a subtree to which the three-dimensional regions corresponding to the changed portion belong.

Aspects of non-limiting embodiments of the present disclosure relate to providing a three-dimensional shape data processing apparatus and a non-transitory computer readable medium for processing a three-dimensional shape by using a combination of plural three-dimensional regions of different sizes, in which sizes of the three-dimensional regions can be set in accordance with properties of respective portions of the three-dimensional shape that are necessary for the processing of the three-dimensional shape.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a three-dimensional shape data processing apparatus including: a processor configured to divide a three-dimensional space including a three-dimensional shape constituted by one or more forming surfaces, which are flat surfaces or curved surfaces or include both flat surfaces and curved surfaces, into plural three-dimensional regions each having a predetermined size, specify, for each of the three-dimensional regions, one or more of the forming surfaces that interfere(s) with the three-dimensional region, and redivide each of the three-dimensional regions until a size of the three-dimensional region reaches a size necessary for reproduction of a property of a portion of the three-dimensional shape expressed by one or more of the forming surfaces that interfere(s) with the three-dimensional region.

BRIEF DESCRIPTION OF THE DRAWINGS

An exemplary embodiment of the present disclosure will be described in detail based on the following figures, wherein.

DETAILED DESCRIPTION

The present exemplary embodiment is described below with reference to the drawings. Identical constituent elements and identical processing are given identical reference signs throughout the drawings, and repeated description thereof is omitted.

Figure 1:
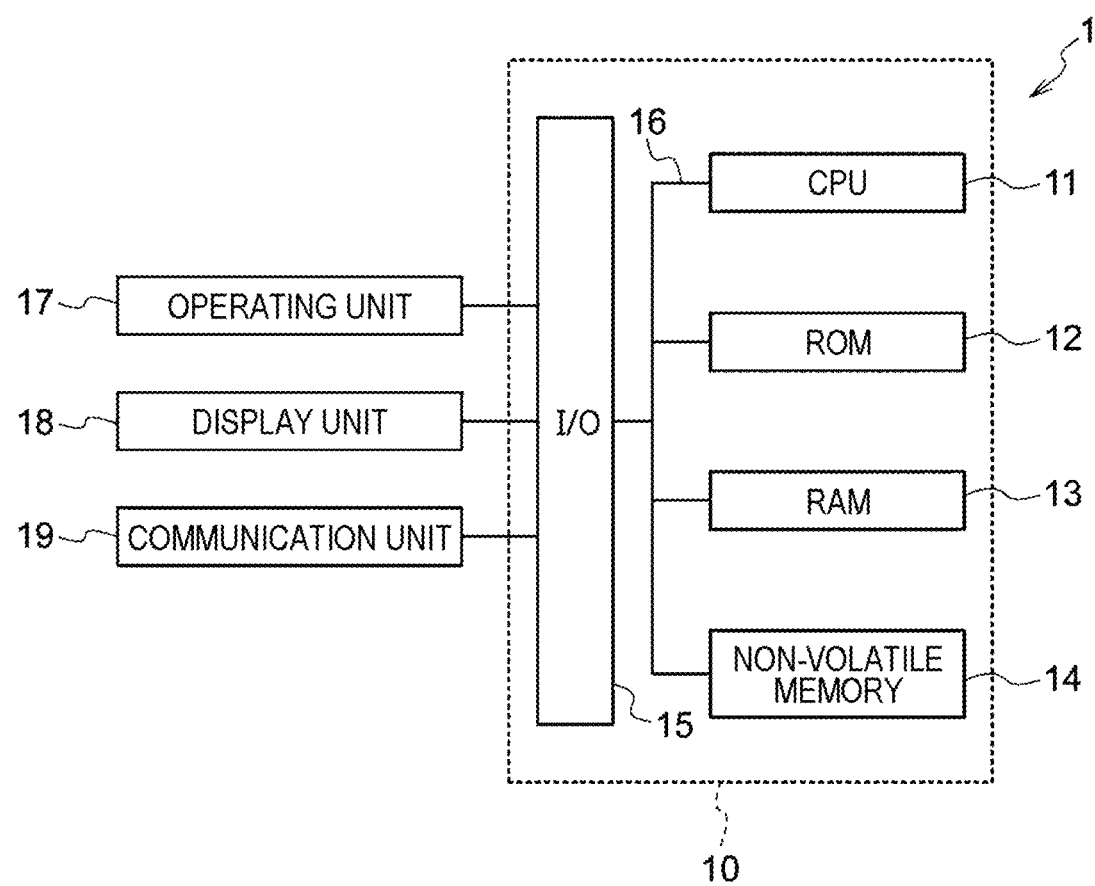
FIG. 1 illustrates an example of a configuration of a three-dimensional shape data processing apparatus.

First, a configuration of a three-dimensional shape data processing apparatus 1 (hereinafter referred to as a processing apparatus 1) according to the present exemplary embodiment is described with reference to FIG. 1.

The processing apparatus 1 is, for example, a computer 10. The computer 10 includes a central processing unit (CPU) 11, which is an example of a processor, a read only memory (ROM) 12, a random access memory (RAM) 13, a non-volatile memory 14, and an input output interface (I/O) 15. The CPU 11, the ROM 12, the RAM 13, the non-volatile memory 14, and the I/O 15 are connected through a bus 16.

The non-volatile memory 14 is an example of a storage device in which stored information is kept even in a case where power supplied to the non-volatile memory 14 is cut off. The non-volatile memory 14 is, for example, a semiconductor memory but may be a hard disk. The non-volatile memory 14 need not necessarily be included in the computer 10 and may be, for example, a portable storage device (e.g., a memory card) detachable from the computer 10.

To the I/O 15, an operation unit 17, a display 18, and a communication unit 19 are connected.

The operation unit 17 is a unit that receives an instruction from a user of the processing apparatus 1 and includes, for example, at least one of input devices such as a keyboard, a pointing device such as a mouse or a touch panel, and a button.

The display 18 is a unit that displays information processed by the CPU 11 and includes, for example, at least one of display devices such as a liquid crystal display, an organic Electro Luminescence (EL) display, and a projector.

The communication unit 19 is connected to a communication line such as the Internet or a local area network (LAN) and includes an interface for data communication with an external device connected to the communication line.

Figure 2:
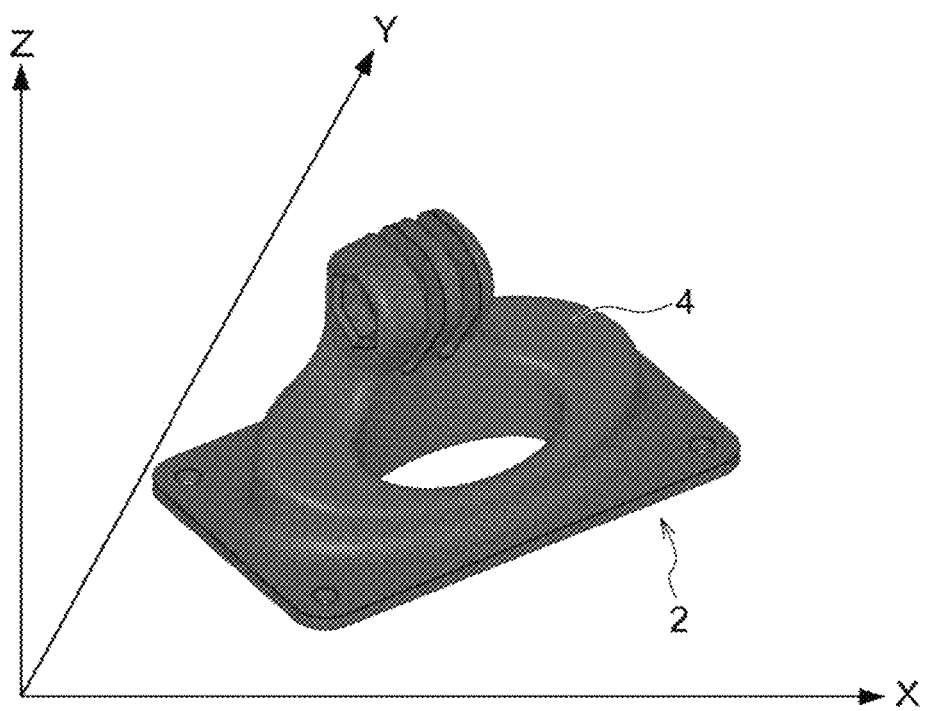
FIG. 2 illustrates an example of a three-dimensional shape of an object.

FIG. 2 illustrates an example of a three-dimensional shape of an object 2 expressed by three-dimensional shape data. A three-dimensional space including the three-dimensional shape of the object 2 is defined by three-dimensional coordinates expressed by an X axis, a Y axis, and a Z axis, and each location of the three-dimensional space is expressed by coordinate values of the three-dimensional coordinates. Note that a direction along the X axis, a direction along the Y axis, and a direction along the Z axis are sometimes referred to as a width, a depth, and a height, respectively.

For example, a data format in which polygons 4 are combined to form a contour of the object 2 may be used as a data format of the three-dimensional shape data expressing the three-dimensional shape of the object 2.

The polygons 4 are forming surfaces that are flat or curved surfaces constituting the shape of the object 2. Examples of the shape of the polygons include, but are not limited to, polygonal shapes such as triangles and rectangles, and the shape of the object 2 is formed by combining plural polygons 4.

The three-dimensional shape data that defines the shape of the object 2 by using the polygons 4 includes information on the shape of the object 2 and information on attributes of the object 2.

The information on the shape of the object 2 includes information indicating the shape of the object 2 such as information on shapes, positions, and directions of the polygons 4 and information on connection between adjacent polygons 4. The information on attributes of the object 2 includes qualities (e.g., a color, a material, and strength of the object 2) of portions of the object 2 expressed by the respective polygons 4, and the qualities of the portions of the object 2 are managed in association with the polygons 4 located in the respective portions. Hereinafter, characteristics or tendencies of a thing indicated by the information on the shape and the information on the attributes are referred to as "properties".

Note only the data format in which the polygons 4 are combined to form the contour of the object 2, but also a data format in which functional curved surfaces such as spline curved surfaces or Bezier curved surfaces are combined to form the contour of the object 2 may be used as a data format of the three-dimensional shape data expressing the three-dimensional shape of the object 2. Alternatively, a data format in which functional curved surfaces such as boundary representation (B-rep) used in computer-aided design (CAD) form the contour of the object 2 may be used. That is, such functional curved surfaces also form the shape of the object 2 and are therefore an example of the forming surface. The following discusses, as an example, a case where the polygons 4 are used as forming surfaces of the object 2.

Adjacent polygons 4 express the shape of the object 2 while sharing vertexes and a side. Accordingly, when a user deforms a shape of a desired portion of the object 2 constituted by the polygons 4, influence of the deformation spreads to an adjacent polygon 4 and then to another adjacent polygon 4, thereby deforming shapes of portions of the object 2 that are not intended to be deformed.

In view of this, the processing apparatus 1 may deform the shape of the object 2, for example, by converting the three-dimensional shape data that defines the shape of the object 2 by using the polygons 4 into three-dimensional shape data that defines the shape of the object 2 by using voxels 6 and processing the three-dimensional shape data constituted by the voxels 6.

Figure 3:
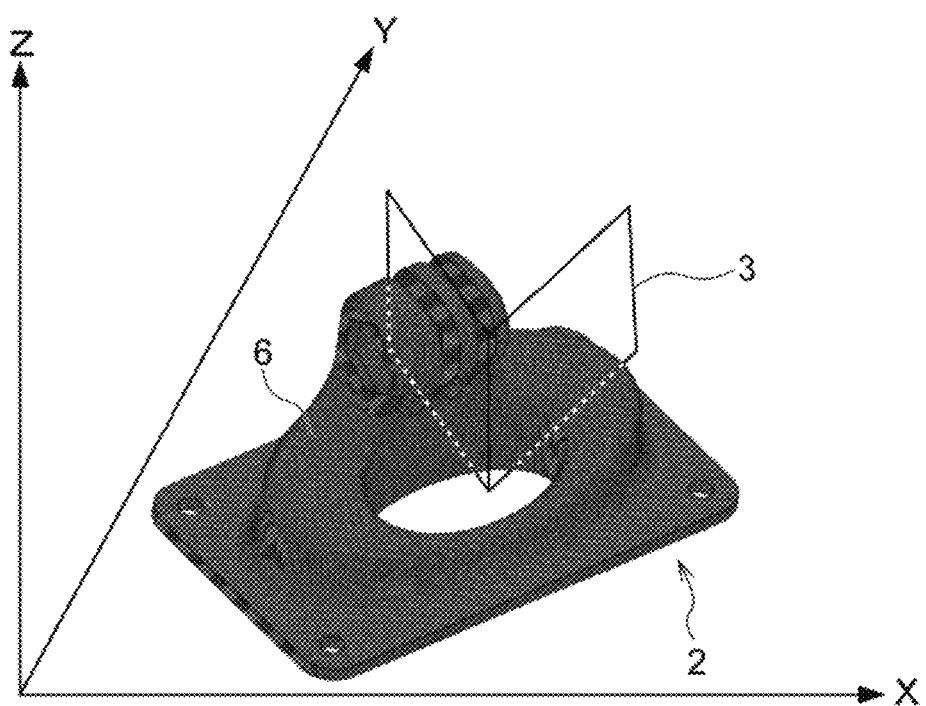
FIG. 3 illustrates an example of a three-dimensional shape of the object constituted by voxels.

FIG. 3 illustrates an example of a three-dimensional shape of the object 2 constituted by the voxels 6.

The voxels 6 are an example of three-dimensional elements that constitute the three-dimensional shape of the object 2. The voxels 6 are, for example, cubes but may be other three-dimensional elements such as cuboids, triangular pyramids, spheres, or cylinders. The following discusses, as an example, a case where the voxels 6 are cubes.

A desired three-dimensional shape of the object 2 is expressed by stacking the voxels 6. In each of the voxels 6, attributes indicative of qualities of the voxel 6 such as a color, strength, a material, and texture may be set. The shape of the object 2 is expressed by the presence or absence of a voxel 6, and attributes, such as a color and a material of the object 2, of a portion where the voxel 6 is disposed are expressed by the attributes of the voxel 6.

Note that the "material" includes at least one of information indicative of a genre of the material such as a resin, a metal, or rubber, information indicative of a name of the material such as ABS or PLA, information indicative of a name, number, or the like of a commercially-available product of the material, information indicative of a name, an abbreviation, a number, or the like used in a standard such as ISO or JIS, and information indicative of properties of the material such as thermal conductivity, electric conductivity, and a magnetic property.

The "texture" is physical property information such as reflectance, transmittance, luster, and surface texture of the object 2 other than the color and a feeling of touch.

The attributes of the object 2 include an attribute pattern set by using at least one of a cycle, a mathematical expression, and other three-dimensional shape data. The attribute pattern includes at least one of successively changing a color, a material, a texture, and the like of three-dimensional shape data in accordance with repetition of a constant cycle, gradation, expression using an inclination or an extreme point expressed by a mathematical expression, other three-dimensional shape data, or the like, filling a designated range of the three-dimensional shape data with a designated shape, and successively changing the designated range of the three-dimensional shape data.

As described above, the three-dimensional shape of the object 2 is expressed by a set of the voxels 6 in a three-dimensional space. Specifically, for example, the three-dimensional shape of the object 2 is expressed by coordinates of the three-dimensional coordinate system that defines the three-dimensional space and element values corresponding to the respective coordinates.

In a case where a voxel 6 is present at coordinates (X, Y, Z) in the three-dimensional space, an element value at the coordinates (X, Y, Z) is set to 1 or more. Meanwhile, in a case where no voxel 6 is present at coordinates (X, Y, Z), an element value at the coordinates (X, Y, Z) is, for example, set to 0. That is, the three-dimensional shape data that defines the three-dimensional shape of the object 2 by using the voxels 6 includes an element value at the coordinates (X, Y, Z) indicative of the presence or absence of a voxel 6 and attributes associated with the voxel 6.

Note that a position in the three-dimensional space need not necessarily be expressed by the coordinates (X, Y, Z) in the three-dimensional space and may be expressed, for example, by an index number of a virtual section (i.e., a three-dimensional region) obtained by dividing the three-dimensional space.

For example, in a case where the three-dimensional space including the object 2 is divided into 100 sections along the X-axis direction, 100 sections along the Y-axis direction, and 100 sections along the Z-axis direction, index numbers "0" to "99" are associated with the three-dimensional regions along the X-axis direction, with the three-dimensional regions along the Y-axis direction, and with the three-dimensional regions along the Z-axis direction. When a combination of index numbers in the X-axis, Y-axis, and Z-axis directions is expressed by $[I_X, I_Y, I_Z]$, 1000000 three-dimensional regions present in the three-dimensional space divided into 100×100×100 sections are expressed by index numbers [0, 0, 0] to [99, 99, 99]. In this case, for example, in a case where a value associated with an index number $[I_X, I_Y, I_Z]$ is 1 or more, a voxel 6 is present at a position indicated by the index number, and in a case where a value associated with an index number $[I_X, I_Y, I_Z]$ is 0, no voxel 6 is present at a position indicated by the index number.

Note that the coordinate system of the three-dimensional space is not limited to a three-dimensional Cartesian coordinate system and may be, for example, a polar coordinate system using a distance r and an angle θ from an origin. In this case, it is only necessary to associate index numbers with pitches of the distance r and the angle θ and indicate the presence of a voxel 6 by designating a value of 1 or more at a position indicated by an index number, as in the above example in which the three-dimensional space can be expressed by index numbers 1, 2, 3 . . . given to respective pitches of the coordinates (X, Y, Z).

Note that in a case where voxels 6 of different shapes are associated with values or 1 or more, a voxel 6 having a shape corresponding to a set value is disposed at a designated position of the three-dimensional space.

In a case where a fine shape such as irregularities or a narrow surface included in the object 2 is expressed by voxels 6, the three-dimensional shape of the object 2 can be expressed in detail by using as small voxels 6 as possible. For example, in a case where a fine shape included in the object 2 is 0.5 mm, the three-dimensional shape of the object 2 can be expressed in more detail by using cubes that are 0.2 mm on a side, which are smaller than the fine shape of the object 2, than by using cubes that are 1 mm on a side.

Figure 4:
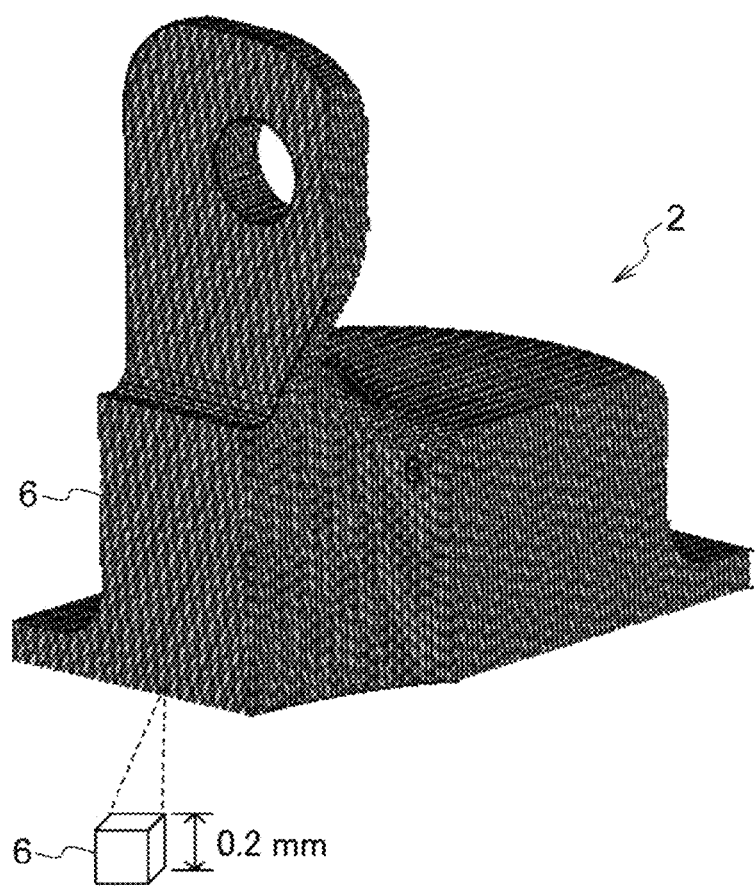
FIG. 4 illustrates an example of a cross section of a three-dimensional shape of the object constituted by voxels of the same size.

FIG. 4 illustrates an example of a cross section, along a plane 3, of the three-dimensional shape of FIG. 3, which expresses the three-dimensional shape of the object 2 illustrated in FIG. 2 having a fine shape of 0.5 mm by using cubic voxels 6 that are 0.2 mm on a side.

Since the three-dimensional shape of the object 2 is expressed by the voxels 6 having a shorter side than the fine shape, the three-dimensional shape of the object 2 illustrated in FIG. 4 is close to an original three-dimensional shape of the object 2 including the fine shape.

However, in a case where the object 2 is expressed by voxels 6 having the same size, for example, an inner portion of the object 2 illustrated in FIG. 4 is also expressed by the cubic voxels 6 that are 0.2 mm on a side. Meanwhile, even in a case where the inner portion of the object 2 illustrated in FIG. 4, which has a larger volume than the fine shape portion, is constituted, for example, by cubic voxels 6 that are 1 cm on a side, there is no problem in expressing the three-dimensional shape of the object 2.

As described above, in a case where all portions of the object 2 are constituted by voxels 6 having the same predetermined size to express the three-dimensional shape of the object 2, some portions of the object 2 are constituted by voxels 6 that are smaller than necessary in expressing the three-dimensional shape of the object 2. This increases the number of voxels 6 more than necessary, resulting in problems that it takes a long time to perform processing concerning the three-dimensional shape of the object 2 and there occurs a shortage of a storage capacity necessary for handling the three-dimensional shape of the object 2 due to an increase in data size of the voxels 6 expressing the three-dimensional shape of the object 2.

In view of this, the three-dimensional shape data processing apparatus 1 according to the present exemplary embodiment sets sizes of the voxels 6 to be disposed in respective portions of the three-dimensional shape of the object 2 in accordance with properties of the portions necessary for processing of the three-dimensional shape of the object 2.

Figure 5:
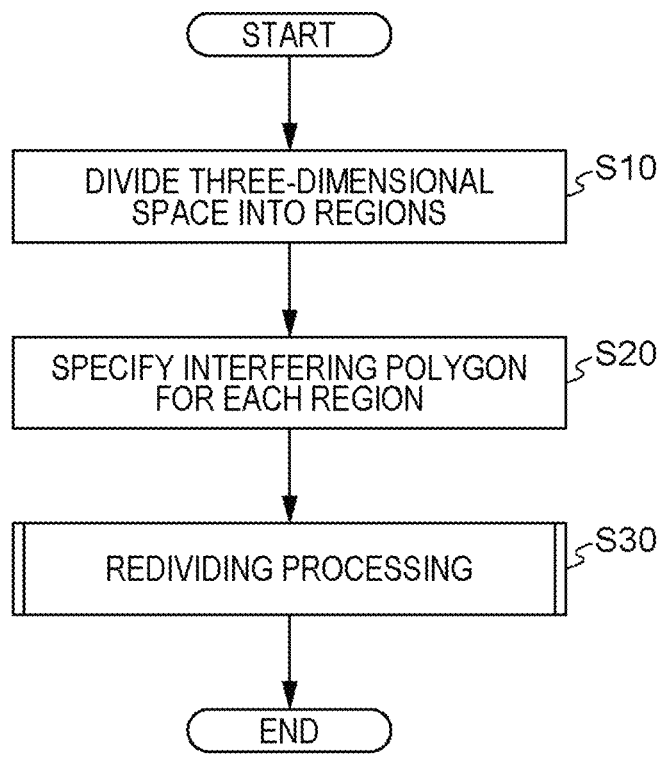
FIG. 5 is a flowchart illustrating an example of processing for dividing the three-dimensional space.

FIG. 5 is a flowchart illustrating an example of processing for dividing the three-dimensional space performed by the CPU 11 of the processing apparatus 1 in a case where the three-dimensional shape data that defines the shape of the object 2 by using the polygons 4 into three-dimensional shape data that defines the shape of the object 2 by using the voxels 6.

A processing program that defines the processing for dividing the three-dimensional space illustrated in FIG. 5 is stored in advance, for example, in the ROM 12 of the processing apparatus 1. The CPU 11 of the processing apparatus 1 performs the processing for dividing the three-dimensional space by reading out the processing program from the ROM 12.

Before performing the processing for dividing the three-dimensional space, the CPU 11 analyzes the three-dimensional shape of the object 2 to be divided and thereby specifies a portion (hereinafter referred to as an "uneven portion"), such as a portion where curvature of the contour is largest, where a degree of change of a shape is larger than other portions in the three-dimensional shape of the object 2. The CPU 11 sets a size of a three-dimensional region in which a voxel 6 that can express a three-dimensional shape of the uneven portion is to be disposed, that is, a finally-attained size of the three-dimensional region and causes the size to be stored, for example, in the non-volatile memory 14.

The CPU 11 may set the finally-attained size of the three-dimensional region by calculation using a dimension of the three-dimensional shape, for example, by setting a half of a minimum dimension of a three-dimensional shape expressed in the uneven portion as one side of the finally-attained size of the three-dimensional region. For example, in the case of the three-dimensional shape of the object 2 illustrated in FIG. 4 whose minimum fine shape is 0.5 mm, a size of a cube that is 0.2 mm on a side, which is smaller than the fine shape, is set as the finally-attained size of the three-dimensional region, and a voxel 6 that has the same size as the finally-attained size of the three-dimensional region is disposed in the three-dimensional region.

The finally-attained size of the three-dimensional region need not necessarily be set by calculation of the CPU 11 and may be designated by a user.

Note that whether or not to preset the finally-attained size of the three-dimensional region is selectable, and the CPU 11 need not necessarily set the finally-attained size of the three-dimensional region.

In step S10, the CPU 11 divides the three-dimensional space in which the object 2 whose contour is constituted by the polygons 4 is disposed, for example, at predetermined intervals along the X-axis, Y-axis, and Z-axis directions to generate plural three-dimensional regions in the three-dimensional space.

Figure 6:
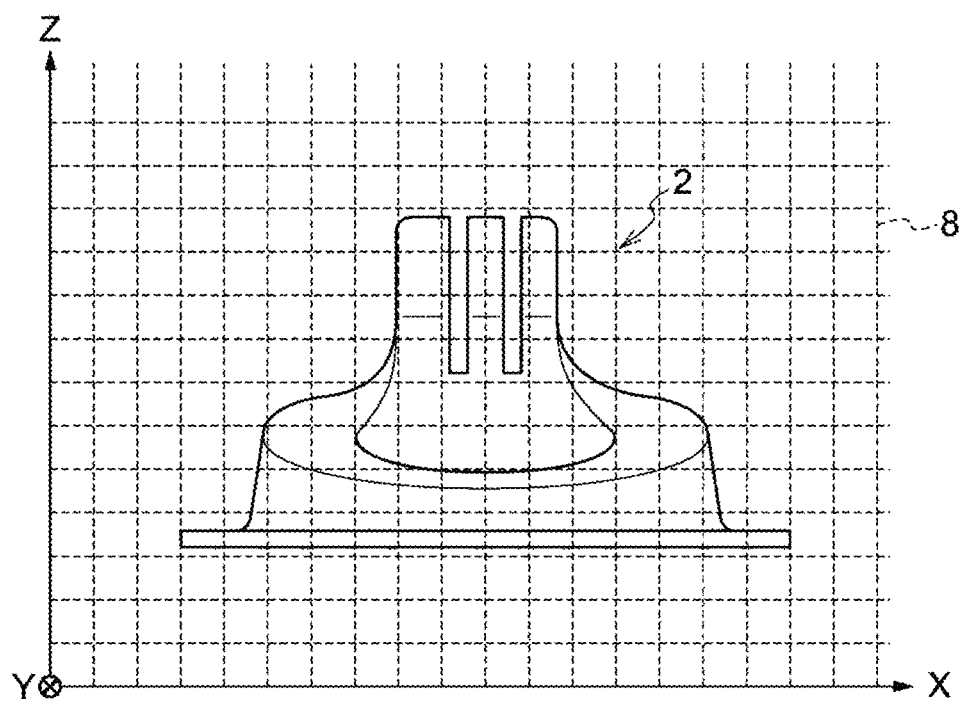
FIG. 6 illustrates an example in which the three-dimensional space including the three-dimensional shape of the object is divided into an initial-division size.

FIG. 6 illustrates an example in which the three-dimensional shape of the object 2 illustrated in FIG. 2 disposed in the three-dimensional space is divided at predetermined intervals along the X-axis, Y-axis, and Z-axis directions. For convenience of description, FIG. 6 illustrates a divided state of the object 2 in a two-dimensional manner viewed from a direction orthogonal to an XZ plane. It should be noted that actually, the object 2 has a depth in the Y-axis direction and is also divided along the XZ plane in the Y-axis direction. Hereinafter, three-dimensional regions obtained by dividing the three-dimensional space is referred to as "regions 8".

The predetermined intervals at which the three-dimensional space is initially divided along the X-axis, Y-axis, and Z-axis directions are referred to as an "initial-division size". For example, in a case where the finally-attained size of the regions 8 is set in advance, the CPU 11 may calculate the initial-division size from the finally-attained size of the regions 8. For example, the CPU 11 may set a size that is N times (N is a real number larger than 1) larger than a length of one side of the finally-attained size of the regions 8 as the initial-division size.

In step S10, the CPU 11 divides the three-dimensional space in which the object 2 is disposed into plural regions 8 of the initial-division size.

As described later, the CPU 11 divides the three-dimensional space in a hierarchical way. Accordingly, before start of division of the object 2, the CPU 11 sets division sizes at respective levels including the initial-division size in consideration of the number of levels in which the three-dimensional space is divided and the number of divisions into how many regions the regions 8 obtained at each level are further divided along each axis direction, in addition to the finally-attained size of the regions 8.

For example, in a case where the finally-attained size of each side of the regions 8 is 0.2 mm and the size of the three-dimensional space to be divided is 1000 mm along each of the X-axis, Y-axis, and Z-axis directions, the CPU 11 sets, for example, the initial-division size, a second-division size, and a third-division size to 100 mm, 20 mm, and 2 mm, respectively, assuming that the number of levels of division of the three-dimensional space is four. At the first level, the CPU 11 divides the three-dimensional space including the object 2 into regions 8 expressed by cubes that are 100 mm on a side in accordance with the initial-division size. At the second level, the CPU 11 divides the regions 8 expressed by cubes that are 100 mm on a side into regions 8 expressed by cubes that are 20 mm on a side in accordance with the second-division size. At the third level, the CPU 11 divides the regions 8 expressed by cubes that are 20 mm on a side into regions 8 expressed by cubes that are 2 mm on a side in accordance with the third-division size. At the fourth level, the CPU 11 divides the regions 8 expressed by cubes that are 2 mm on a side into regions 8 expressed by cubes that are 0.2 mm on a side in accordance with the finally-attained size.

Even in a case where the finally-attained size of each side of the regions 8 is kept at 0.2 mm, the CPU 11 sets the initial-division size, the second-division size, the third-division size, and a fourth-division size to 200 mm, 50 mm, 10 mm, and 1 mm, respectively, assuming that the number of levels of division is five. At the first level, the CPU 11 divides the three-dimensional space including the object 2 into regions 8 expressed by cubes that are 200 mm on a side in accordance with the initial-division size. At the second level, the CPU 11 divides the regions 8 expressed by cubes that are 200 mm on a side into regions 8 expressed by cubes that are 50 mm on a side in accordance with the second-division size. At the third level, the CPU 11 divides the regions 8 expressed by cubes that are 50 mm on a side into regions 8 expressed by cubes that are 10 mm on a side in accordance with the third-division size. At the fourth level, the CPU 11 divides the regions 8 expressed by cubes that are 10 mm on a side into regions 8 expressed by cubes that are 1 mm on a side in accordance with the fourth-division size. Finally, the CPU 11 divides the regions 8 expressed by cubes that are 1 mm on a side into regions 8 expressed by cubes that are 0.2 mm on a side in accordance with the finally-attained size.

The CPU 11 desirably sets the size of the three-dimensional space to be divided to a size that is dividable by division sizes corresponding to respective levels so that regions 8 having the same size are obtained at each level.

Note that the CPU 11 need not necessarily set the number of levels in which the three-dimensional space is to be divided and division sizes at the respective levels before start of division of the three-dimensional space and may set the number of levels and division sizes of the respective levels every time regions 8 are divided.

For example, in a case where the size of the three-dimensional space to be divided is 1000 mm along each of the X-axis, Y-axis, and Z-axis directions, the CPU 11 reduces 1000 mm at a predetermined rate (e.g., 1/10) and sets the reduced size (100 mm if the rate is 1/10) as the initial-division size. The CPU 11 divides regions 8 at the predetermined rate, and when a size of regions 8 obtained by the division becomes smaller than a minimum dimension of a three-dimensional shape expressed in the uneven portion of the object 2, finishes division by considering that the size of regions 8 has reached a size that can express the uneven portion of the object 2. In this case, the size of the regions 8 obtained when the division is finished is the finally-attained size.

Although an example in which the three-dimensional space is divided into cubic regions 8 has been described above, the shape of the regions 8 is not limited to a cube. The shape of the regions 8 may be any of other shapes such as a cuboid, a triangular pyramid, a sphere, and a cylinder, as in the case of the voxels 6. By setting the intervals at which the three-dimensional space is divided along the X-axis, Y-axis, and Z-axis directions so that the intervals differ from one axis to another, the three-dimensional space is divided into cuboid regions 8 that is, for example, 1 mm wide, 2 mm deep, and 0.5 mm high. Furthermore, the CPU 11 may set the number of regions 8 into which the three-dimensional space is divided along the X-axis, Y-axis, and Z-axis directions so that the number of regions 8 into which the three-dimensional space is divided varies from one axis another (e.g., the three-dimensional space is divided into five regions 8 along the X-axis direction, four regions 8 along the Y-axis direction, and two regions 8 along the Z-axis direction). Furthermore, the CPU 11 may divide the three-dimensional space into regions 8 of different shapes at respective levels of division.

In a case where the CPU 11 divides the three-dimensional space into regions 8 so that at least one of width, depth, and height of the regions 8 is different from the others, the CPU 11 desirably sets the size of the three-dimensional space to be divided to a size that is dividable by divisions sizes corresponding to respective levels.

In step S20, the CPU 11 specifies, for each of the regions 8, a polygon 4 that interferes with the region 8.

The state where a polygon 4 interferes with a region 8 is a state where a polygon 4 expressing a surface of the object 2, that is, a contour of the object 2 is in contact with or is included in a predetermined range (referred to as an "interference range") of the region 8. For example, in a case where a region 8 itself is set as an interference range of the region 8, a state where at least a part of a polygon 4 is in contact with or is included in the region 8 is referred to as a state where the polygon 4 interferes with the region 8.

A method using an index number is used to associate a region 8 and a polygon 4 that interferes with the region 8. For example, assume that the three-dimensional shape of the object 2 is constituted by 5000 polygons 4. Furthermore, assume that the three-dimensional space including the object 2 is divided into 100 regions 8 along the X-axis direction, 100 regions 8 along the Y-axis direction, and 100 regions 8 along the Z-axis direction by initial division, that is, division at the first level so that the three-dimensional space is divided into 1000000 regions 8.

In this case, the CPU 11 associates index numbers P1 to P5000 with the respective polygons 4 and associates index numbers [0, 0, 0] to [99, 99, 99] with the respective regions 8. The CPU 11 specifies, for each of the regions 8, all polygons 4 that interfere with the region 8 and causes a correspondence between an index number of the region 8 and index numbers of all polygons 4 that interfere with the region 8 to be stored in the RAM 13.

In a case where the contour of the object 2 is expressed not by polygons 4 but by a functional curved surface, a range of the functional curved surface that interferes with a region 8 is sometimes hard to grasp. Therefore, the CPU 11 may divide the functional curved surface into plural partial curved surfaces (also referred to as "patches") and specify patches of the functional curved surface that interfere with a region 8.

Next, a method for specifying a polygon 4 that interferes with a region 8 is specifically described.

Figure 7:
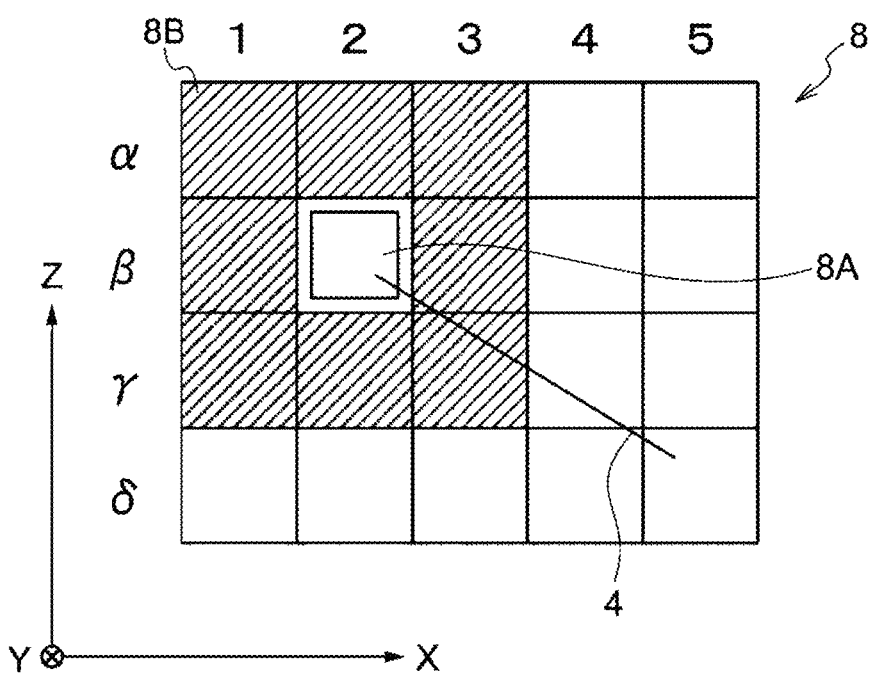
FIG. 7 illustrates an example of adjacent regions adjacent to a specific three-dimensional region that interferes with a polygon.

FIG. 7 illustrates an example in which any one of polygons 4 that constitute the contour of the object 2 is selected and plural regions 8 in a specific range around the selected polygon 4 including the selected polygon 4 are extracted from the three-dimensional space. For convenience of description, in FIG. 7, the selected polygon 4 and the plural regions 8 are illustrated in a two-dimensional manner viewed from a direction orthogonal to the XZ plane. Furthermore, in FIG. 7, position numbers 1 to 5 are given to the plural region 8 along the X-axis direction and position numbers α to δ are given to the plural region 8 along the Z-axis direction in order to designate a specific region 8 from among the plural regions 8. Hereinafter, a region 8 is designated by using the position numbers. For example, a region 8 located at an upper left corner at which a row of the position number α and a column of the position number 1 intersect is referred to as a "region 8 of the position number α1".

First, the CPU 11 specifies any one of the regions 8 that interfere with the selected polygon 4 as a target region 8A. Specifically, the CPU 11 selects any one of three-dimensional vertexes P that constitute the polygon 4 and specifies a region 8 including the three-dimensional vertex P. A quotient (not including a remainder) obtained by dividing coordinates Px, Py, Pz of the three-dimensional vertex P by a size Dx, Dy, Dz of the region 8 can be specified as an index of the target region 8A including the three-dimensional vertex P. Note that Dx represents a width of the region 8, Dy represents a depth of the region 8, and Dz represents a height of the region 8.

Figure 8:
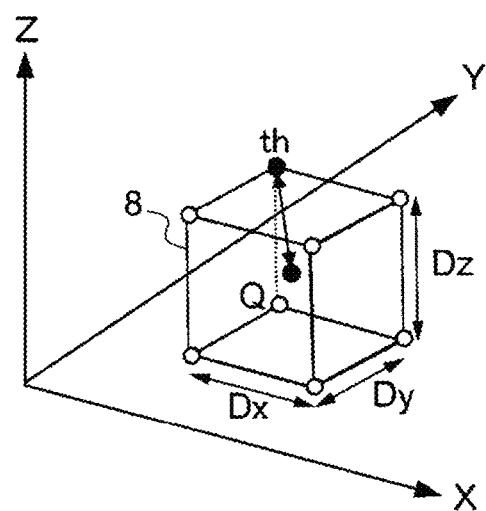
FIG. 8 is a view for explaining an example of setting of an interference range of a three-dimensional region.

For example, as illustrated in FIG. 8, the CPU 11 sets a center of the region 8 that is equidistant from vertexes of the region 8 as a reference point Q and specifies whether or not the selected polygon interferes with the region 8 by determining whether or not the selected polygon 4 is in contact with or included in a sphere 9 (see FIG. 9) whose center is located at the reference point Q and whose radius is a distance th (referred to as a "threshold value th") from the reference point Q to a vertex of the region 8.

Note that the CPU 11 need not set the center of the region 8 as the reference point Q and can set any position inside or outside the region 8 as the reference point Q of the region 8. In this case, the CPU 11 need just specify whether or not the selected polygon 4 interferes with the region 8 by determining whether or not the selected polygon 4 is in contact with or included in a sphere 9 whose center is located at the reference point Q and whose radius is a predetermined distance from the reference point Q. The number of reference points Q that can be set for a single region 8 is not limited to one, and plural reference points Q may be set for a single region 8. For example, the CPU 11 may set the vertexes of the region 8 as reference points Q and specify that the selected polygon 4 interferes with the region 8 in a case where the selected polygon 4 is in contact with or is included in any one of spheres 9 whose centers are located at the respective reference points Q and whose radiuses are the threshold value th.

Figure 9:
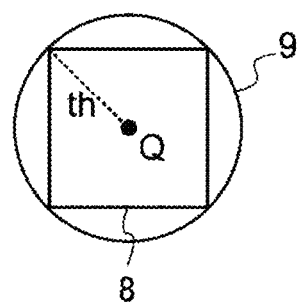
FIG. 9 illustrates an example of an interference range of a three-dimensional region.

In the example of the interference range of the region 8 illustrated in FIG. 9, the interference range is set wider than the region 8. Meanwhile, the CPU 11 may set the region 8 itself as an interference range, perform known collision detection for determining whether or not the selected polygon 4 collides with the region 8, and in a case where the selected polygon 4 collides with the region 8, specify that the selected polygon 4 interferes with the region 8.

In a case where the center of the region 8 is set as the reference point Q, the threshold value th is expressed by the following equation (1). Note that "$\sqrt{\phantom{x}}$" represents a square root, and "*" represents multiplication.

$$th = \sqrt{(Dx^2 + Dy^2 + Dz^2)} * 0.5 \quad (1)$$

That is, in a case where the region 8 is a cuboid, the CPU 11 sets a range of a circumscribing sphere of the cuboid as an interference range. Even in a case where the shape of the region 8 is any shape other than a cube or a cuboid, the CPU 11 may associate a virtual cube with the region 8 and set a range of a circumscribing sphere of the virtual cube as an interference range of the region 8. Needless to say, the CPU 11 may set the range of the region 8 itself as an interference range irrespective of the shape of the region 8.

Note that a method for specifying a polygon 4 that interferes with a region 8 is not limited to the above method. For example, the CPU 11 may obtain an inner product of a vector to a polygon 4 closest to the reference point Q and vectors to respective vertexes of the region 8 and specify a polygon 4 that interferes with the region 8 by determining whether or not signs match each other. Alternatively, the CPU 11 may generate points on the polygon 4 and specify a region 8 including the points as a region 8 that interferes with the polygon 4.

In FIG. 7, the CPU 11 sets, as the target region 8A, the region 8 of the position number β2 indicated by the double frame among the plural regions 8 that interfere with the selected polygon 4. The target region 8A is an example of a reference three-dimensional region.

The CPU 11 sets, as adjacent regions 8B, all regions 8 that surround the target region 8A and are adjacent to the target region 8A. In the example illustrated in FIG. 7, the regions 8 shaded by the diagonal lines are included in the adjacent regions 8B. Actually, the regions 8 are arranged in a three-dimensional manner, and therefore nine regions 8 adjacent to the target region 8A and the shaded regions 8 on a near side along the Y axis and nine regions 8 adjacent to the target region 8A and the shaded regions 8 on a far side along the Y axis, that is, 18 regions 8 in total are also the adjacent regions 8B. Accordingly, in the example illustrated in FIG. 7, 26 adjacent regions 8B are set for the single target region 8A. The adjacent regions 8B are an example of adjacent three-dimensional regions.

The CPU 11 specifies, for each of the adjacent regions 8B, whether or not the selected polygon 4 interferes with the adjacent region 8B.

Figure 10:
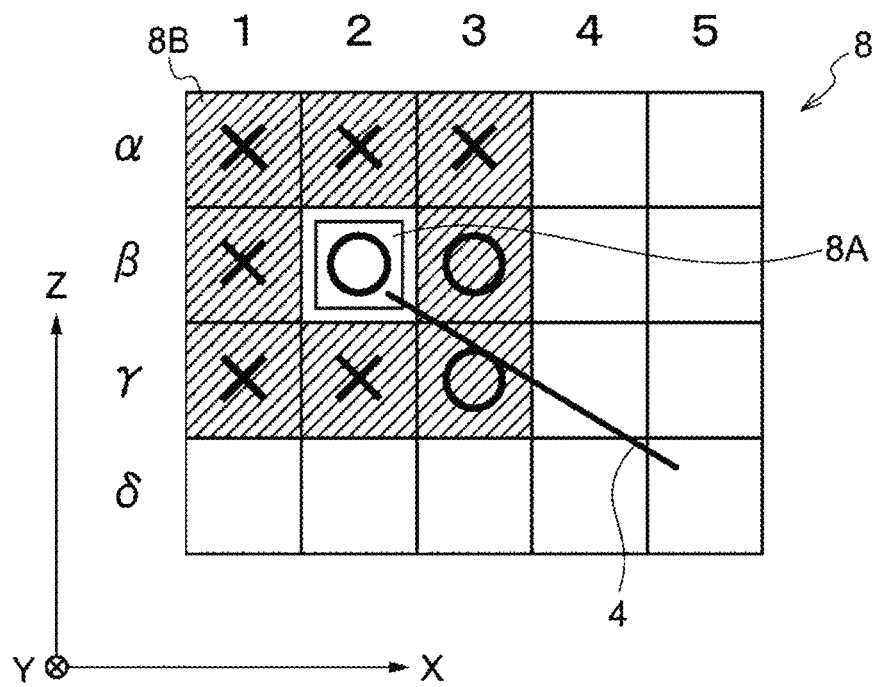
FIG. 10 illustrates an example of adjacent regions.

FIG. 10 illustrates an example of a result of specifying, for each of the adjacent regions 8B illustrated in FIG. 7, whether or not the selected polygon 4 interferes with the adjacent region 8B. In FIG. 10, the circle mark indicates that the adjacent region 8B interferes with the selected polygon 4, and the cross mark indicates that the adjacent region 8B does not interfere with the selected polygon 4. The target region 8A is also indicated by the circle mark since it is apparent that the target region 8A interferes with the selected polygon 4.

The CPU 11 associates the selected polygon 4 with the regions 8 with which the selected polygon 4 interferes. Specifically, the CPU 11 causes a correspondence between the index number of the selected polygon 4 and the index number of the target region 8A to be stored in the RAM 13.

Termination information indicating that an interference state with the selected polygon 4 has been already determined is associated with the target region 8A and the adjacent regions 8B since an interference state with the selected polygon 4 has been already determined as for the target region 8A and the adjacent regions 8B whose interference state with the selected polygon 4 has been specified.

Figure 11:
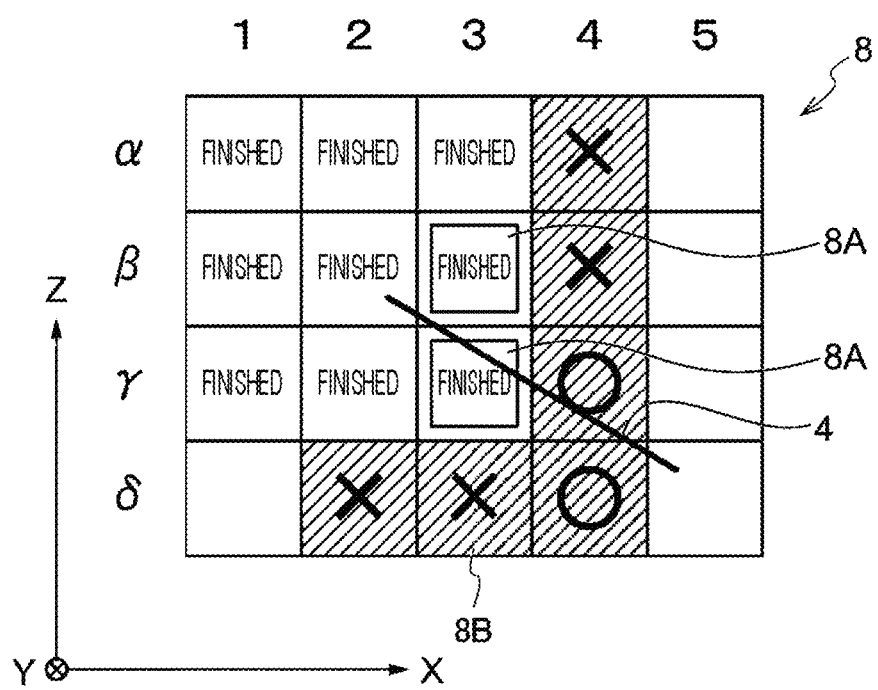
FIG. 11 illustrates an example of adjacent regions after a target region is changed.

FIG. 11 illustrates an example of a state where the termination information has been associated with the target region 8A and the adjacent regions 8B upon receipt of the specifying result illustrated in FIG. 10. In FIG. 11, "FINISHED" is written in the regions 8 with which the termination information has been associated.

The CPU 11 sets, as new target regions 8A, adjacent regions 8B that interfere with the selected polygon 4 among the adjacent regions 8B adjacent to the target region 8A of the position number β2. In the example of FIG. 11, the adjacent region 8B of the position number β3 and the adjacent region 8B of the position number γ3 are set as the new target regions 8A.

The CPU 11 sets adjacent regions 8B for each of the new target regions 8A and specifies, for each of adjacent regions 8B excluding the adjacent regions 8B with which the termination information has been associated among the set adjacent regions 8B, whether or not the selected polygon 4 interferes with the adjacent region 8B.

In a case where there are plural new target regions 8A as illustrated in FIG. 11, the CPU 11 sets adjacent regions 8B for any one of the new target regions 8A, specifies whether or not the selected polygon 4 interferes with the adjacent regions 8B, and then sequentially performs the same processing for the other new target regions 8A.

In the example illustrated in FIG. 11, the CPU 11 specifies that the selected polygon 4 interferes with the adjacent regions 8B of position numbers γ4 and δ4 among adjacent regions 8B adjacent to the target region 8A of the position number β3 and the target region 8A of the position number γ3.

The CPU 11 repeats the processing for specifying adjacent regions 8B that interfere with the selected polygon 4 among adjacent regions 8B adjacent to new target regions 8A and setting, as new target regions 8A, the adjacent regions 8B that interfere with the selected polygon 4 until there is no adjacent region 8B that interferes with the selected polygon 4. The state where there is no adjacent region 8B that interferes with the selected polygon 4 is a state where the termination information has been associated with all adjacent regions 8B or a state where the selected polygon 4 does not interfere with any of adjacent regions 8B excluding adjacent regions 8B with which the termination information has been associated.

Figure 12:
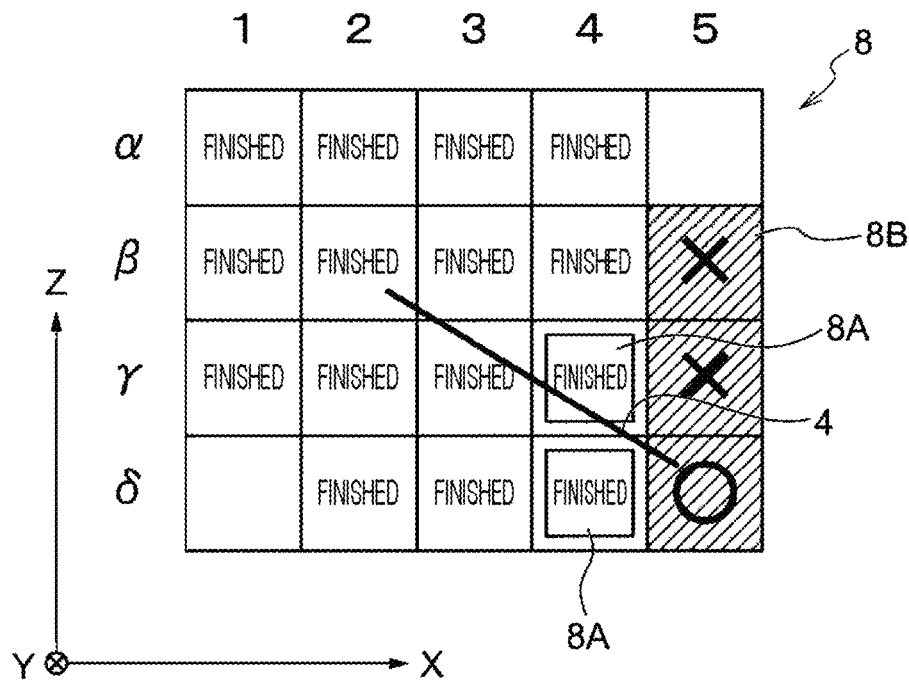
FIG. 12 illustrates an example of adjacent regions after a target region is further changed.

Next, as illustrated in FIG. 12, the adjacent region 8B of the position number γ4 and the adjacent region 8B of the position number δ4 are set as new target regions 8A, and regions 8 of the position number β5, the position number γ5, and the position number δ5 are set as adjacent regions 8B for these new target regions 8A. In a case where it is specified that the adjacent region 8B of the position number δ5 interferes with the selected polygon 4 among the set adjacent regions 8B, the adjacent region 8B of the position number δ5 is set as a new target region 8A. However, the new target region 8A has no adjacent region 8B that interferes with the selected polygon 4, and therefore the processing for specifying a region 8 that interferes with the selected polygon 4 is finished.

Through the above processing, it is specified that the selected polygon 4 interferes with the position number β2, the position number β3, the position number γ3, the position number γ4, the position number δ4, and the position number δ5.

The CPU 11 sequentially selects polygons 4 that constitute the contour of the object 2 until all polygons 4 that constitute the contour of the object 2 are selected and specify all regions 8 that interfere with these polygons 4 by the above method. As a result, index numbers of all interfering polygons 4 are associated with an index number of each region 8, and therefore interfering polygons 4 are specified for each region 8. The number of polygons 4 that interfere with a region 8 may be 0, 1, or more than 1.

After specifying an interfering polygon 4 for each region 8, the CPU 11 redivides each of the regions 8 until the size of each region 8 reaches a size necessary for reproduction of a property of a portion of the three-dimensional shape of the object 2 expressed by the interfering polygon 4 in step S30 of the processing for dividing the three-dimensional space illustrated in FIG. 5.

Figure 13:
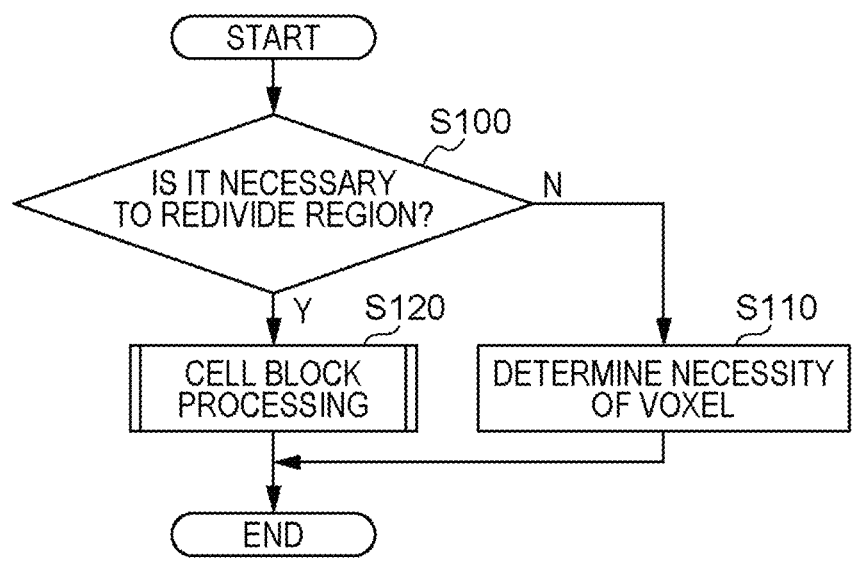
FIG. 13 is a flowchart illustrating an example of a flow of redividing processing.

FIG. 13 is a flowchart illustrating an example of a flow of the redividing processing in step S30 of FIG. 5.

Since an interfering polygon 4 has been specified for each region 8, an example in which the CPU 11 performs the redividing processing illustrated in FIG. 8 on the regions 8 in parallel is described. That is, the CPU 11 performs the redividing processing on the regions 8 in parallel by inputting the regions 8 obtained by the division into the initial division size to respective redividing processing executed in as many processes as the number of regions 8.

Note that whether or not the redividing processing is performed on the regions 8 in parallel in respective processes is selected by user's settings. In a case where the redividing processing is not performed in parallel, the redividing processing is performed, for example, in a single process. Specifically, the CPU 11 selects a region 8 and performs the redividing processing on the selected region 8 sequentially until all of the regions 8 are selected.

In step S100, the CPU 11 determines whether or not it is necessary to redivide an input region 8. Whether or not it is necessary to redivide an input region 8 is determined, for example, on the basis of information on the shape of the object 2 such as information indicating which portion of the three-dimensional shape of the object 2 the region 8 is intended to reproduce.

In a case where no polygon 4 interferes with the region 8, the region 8 is not a region 8 disposed at a portion that expresses the contour of the object 2 but a region 8 that is disposed outside the object 2 or inside the object 2. That is, redividing such a region 8 into a smaller size hardly leads to expressing the three-dimensional shape of the object 2 in more detail than a current state. In view of this, the CPU 11 determines that it is unnecessary to redivide the region 8 by regarding that the size of the region 8 has reached a size necessary for reproduction of a corresponding portion of the three-dimensional shape of the object 2 and proceeds to step S110. That is, redivision of the region 8 is stopped.

Furthermore, even in a case where there is a polygon 4 that interferes with the region 8, the CPU 11 determines that it is unnecessary to redivide the region 8 and proceeds to step S110 in a case where a three-dimensional shape of the object 2 expressed by the polygon 4 that interferes with the region 8 can be defined by the region 8 of a current size.

Meanwhile, in a case where there is a polygon 4 that interferes with the region 8 and a three-dimensional shape of the object 2 expressed by the polygon 4 that interferes with the region 8 cannot be defined by the region 8 of a current size, the CPU 11 determines that it is necessary to redivide the region 8 and proceeds to step S120.

An example of a method for determining whether or not a three-dimensional shape of the object 2 expressed by a polygon 4 that interferes with a region 8 can be defined by the region 8 of a current size is specifically described below.

In a case where a polygon 4 that interferes with a region 8 expresses a flat surface of the three-dimensional shape of the object 2, a portion of the three-dimensional shape of the object 2 expressed by the polygon 4 can be defined by a current size of the region 8. Therefore, in such a case, the CPU 11 determines that it is unnecessary to redivide the region 8 by regarding that the size of the region 8 has reached a size necessary for reproduction of the portion of the three-dimensional shape of the object 2 expressed by the interfering polygon 4. That is, redivision of the region 8 is stopped.

Whether or not the polygon 4 that interferes with the region 8 expresses a flat surface of the three-dimensional shape of the object 2 may be determined on the basis of variance $\sigma^2$ of a normal unit vector of the polygon 4 that interferes with the region 8. Even in a case where there are plural polygons 4 that interfere with the region 8, when the variance $\sigma^2$ of normal unit vectors of the polygons 4 that interfere with the region 8 is 0, the polygons 4 express the same flat surface of the three-dimensional shape of the object 2. Note that the CPU 11 may determine that the polygons 4 that interfere with the region 8 express the same flat surface of the three-dimensional shape of the object 2 in a case where the variance $\sigma^2$ of normal unit vectors of the polygons 4 that interfere with the region 8 is equal to or less than a predetermined threshold value $\sigma_{th}$ in consideration of an error included in positional information of the polygons 4 and a process for calculating the variance $\sigma^2$ of the normal unit vectors of the polygons 4. In this case, the threshold value $\sigma_{th}$ need just be set to a maximum value of the variance $\sigma^2$ at which it can be regarded that the polygons 4 constitute the same flat surface.

Alternatively, the CPU 11 may determine that it is unnecessary to redivide the region 8 in a case where a variation of shapes of polygons 4 that interfere with the region 8 is equal to or less than a threshold value. Note that whether or not it is necessary to redivide a region 8 may be determined on the basis of not information on the shape of the object 2, but information on attributes of the object 2.

For example, in a case where a variation of attribute values of attributes in a range of the three-dimensional shape of the object 2 expressed by polygons 4 that interfere with the region 8 falls within a predetermined allowable range, the CPU 11 determines that a size of the region 8 has reached a size necessary for reproduction of the attributes in the portion of the three-dimensional shape of the object 2 expressed by the interfering polygon 4 and determines that it is unnecessary to redivide the region 8. In this case, the CPU 11 proceeds to step S110, and redivision of the region 8 is stopped.

An example in which a color of the object 2 is focused on as an attribute of the object 2 is described below. In a case where a variation exceeding an allowable range occurs in color of a range of the three-dimensional shape of the object 2 expressed by polygons 4 that interfere with the region 8, the color of the object 2 cannot be defined by the region 8 of a current size since only a single attribute value can be associated with each attribute in a single region 8. To express the variation that exceeds the allowable range, the color of the range needs to be expressed by a region 8 smaller than a current size. Therefore, the CPU 11 determines that it is necessary to redivide the region 8 and proceeds to step S120.

Meanwhile, in a case where there is no variation that exceeds the allowable range in color of the range of the three-dimensional shape of the object 2 expressed by the polygons 4 that interfere the region 8, the color of the range can be expressed by the region 8 of the current size. Therefore, the CPU 11 determines that it is unnecessary to redivide the region 8 and proceeds to step S110.

As described above, the CPU 11 may determine whether or not it is necessary to redivide a region 8 on the basis of whether or not a variation in attribute value of any of attributes of the object 2 in a range of the three-dimensional shape of the object 2 expressed by polygons 4 that interfere with the region 8 exceeds an allowable range. Needless to say, in a case where whether or not it is necessary to redivide a region 8 is determined by using information on an attribute of the object 2, not only a color of the object 2, but also any kind of attribute may be used, as long as the attribute is an attribute associated with the object 2 as an attribute of the object 2 such as a material of the object 2 or an area of polygons 4 in a range that interferes with the region 8. That is, the CPU 11 determines whether or not it is necessary to redivide a region 8 in accordance with the region 8 and a variation in property of polygons 4 that interfere with the region 8. Whether a polygon 4 that interferes with a region 8 express a flat surface or a curved surface of the three-dimensional shape of the object 2 is an example of a variation in property in a range of the polygon 4 that interferes with the region 8.

Furthermore, the CPU 11 may determine whether or not it is necessary to redivide a region 8 by combining information on the shape of the object 2 and information on attributes of the object 2. That is, the CPU 11 stops redivision of a region 8 in a case where a size of the region 8 has reached a size necessary for reproduction of a property of a portion of the three-dimensional shape of the object 2 expressed by an interfering polygon 4 and proceeds to step S110. Otherwise, the CPU 11 proceeds to step S120.

In step S110, the CPU 11 determines necessity of a voxel 6 in a region 8. Determining necessity of a voxel 6 in a region 8 means determining whether or not to dispose a voxel 6 in the region 8.

The CPU 11 determines whether or not to dispose a voxel 6 in a region 8 in accordance with a positional relationship between the region 8 and the polygons 4.

For example, in a case where one or more polygons 4 interfere with the region 8, the CPU 11 may dispose a voxel 6 in the region 8 by regarding that the region 8 corresponds to a portion expressing the contour of the object 2. Disposing a voxel 6 in the region 8 means disposing a voxel 6 that has the same size and the same shape as the region 8 obtained by division.

In a case where there is no polygon 4 that interferes with the region 8, the region 8 corresponds to a portion outside the object 2 that is located far enough not to interfere with the contour of the object 2 or corresponds to a portion inside the object 2 that is located far enough not to interfere with the contour of the object 2. It is unnecessary to dispose a voxel 6 in the region 8 in a case where the region 8 corresponds to a portion expressing an outside of the object 2, but it is desirable to dispose a voxel 6 in the region 8 in a case where the region 8 corresponds to a portion expressing an inside of the object 2.

Therefore, in a case where there is no polygon 4 that interferes with the region 8, necessity of a voxel 6 in the region 8 may be determined on the basis of a result of determination as to necessity of a voxel 6 in an adjacent region 8B adjacent to the region 8 after determination as to necessity of a voxel 6 is finished for all regions 8.

Specifically, an adjacent region 8B located on a reverse side of a normal vector of the polygon 4 is located on an inner side of the three-dimensional shape whose contour is defined by the polygons 4, and all regions 8 adjacent to the adjacent region 8B are determined as being located inside until these regions 8 become adjacent to a region 8 determined as needing a voxel next (Region Growing). Conversely, it can be determined that a region 8 that does not interfere with any polygon 4 among three-dimensional regions located at an end of the three-dimensional space including the three-dimensional shape is apparently outside the three-dimensional shape. An adjacent region 8 adjacent to this region 8 and all regions 8 adjacent to the adjacent region 8B are determined as being located outside the three-dimensional shape until these regions 8 becomes adjacent to a region 8 determined as needing a voxel next. Both of these kinds of processing may be performed or all of remaining regions 8 may be regarded as being located outside the three-dimensional shape after completion of the inner region determining process. Note that whether or not there is a polygon 4 that interferes with a region 8 is an example of a variation in property in a range of a polygon 4 that interferes with the region 8.

The CPU 11 may calculate a signed distance field (SDF) from a reference point Q of a region 8 to a closest polygon 4 in order to specify whether or not a polygon 4 interferes with the region 8 in step S20 of FIG. 5 and determine necessity of a voxel 6 in the region 8 in accordance with a sign of the SDF. As described above, a position of the reference point Q is not restrictive, and the reference point Q is set, for example, at a center of the region 8 or a vertex of the region 8. In a case where there are plural reference points Q, for example, any one of the reference points Q may be selected as a reference point Q for calculating an SDF of the region 8 or an average position of positions of the reference points Q may be used as a new reference point Q for calculating an SDF of the region 8.

The sign of the SDF is plus in a case where the reference point Q is included in an inside of the object 2 and is minus in a case where the reference point Q is included in an outside of the object 2. An absolute value (also referred to as a "distance value") of the SDF represents a distance from the reference point Q to the closest polygon 4. This means that in a case where the SDF of the region 8 is 0 or more, the region 8 corresponds to a portion inside the object 2, and in a case where the SDF of the region 8 is less than 0, the region 8 corresponds to a portion outside the object 2. Note that the CPU 11 may define the meanings of the signs reversely and may manage distance values and information such as an outside and an inside of the object 2 individually.

In a case where the SDF of the region 8 is 0 or more, the region 8 corresponds to a portion inside the object 2, and therefore the CPU 11 determines that it is necessary to dispose a voxel 6 in the region 8.

The CPU 11 disposes a voxel 6 in each of regions 8 determined as needing a voxel 6 so that the three-dimensional shape of the object 2 is constituted by such voxels 6. Then, the CPU 11 associates, with a voxel 6 disposed in the region 8, at least one of an attribute of a polygon 4 that interferes with the region 8 and an attribute linked with the region 8 and an attribute value thereof.

Kinds of the attribute associated with the voxel 6 include an SDF, a material of the polygon 4 that interferes with the region 8, a result of structural analysis of the object 2 in the region 8, and a result of analysis of heat transfer in the object 2. The attribute value associated with the voxel 6 may be an average value or a representative value of attribute values in the region 8 in which the voxel 6 is disposed.

Although an example in which a voxel 6 is disposed in a region 8 determined as needing a voxel 6 has been described above, a voxel 6 need not necessarily disposed even in a region 8 determined as needing a voxel 6. For example, the CPU 11 may associate, with a region 8 determined as needing a voxel 6, at least one of an attribute of a polygon 4 that interferes with the region 8 and an attribute linked with the region 8 and an attribute value thereof instead of disposing a voxel 6 in the region 8.

Furthermore, the CPU 11 may also associate, with a region 8 determined as needing no voxel 6, that is, a region 8 located outside the three-dimensional shape, at least one of an attribute of a polygon 4 that interferes with the region 8 and an attribute linked with the region 8 and an attribute value thereof. Examples of the attribute linked with a region 8 determined as needing no voxel 6 include a temperature distribution of the three-dimensional space and a result of fluid analysis of air flowing around the object 2 obtained by a wind-tunnel test.

Next, cell block processing in step S120, which is performed in a case where it is determined in step S100 of FIG. 13 that it is necessary to redivide a region 8, is described.

Figure 14:
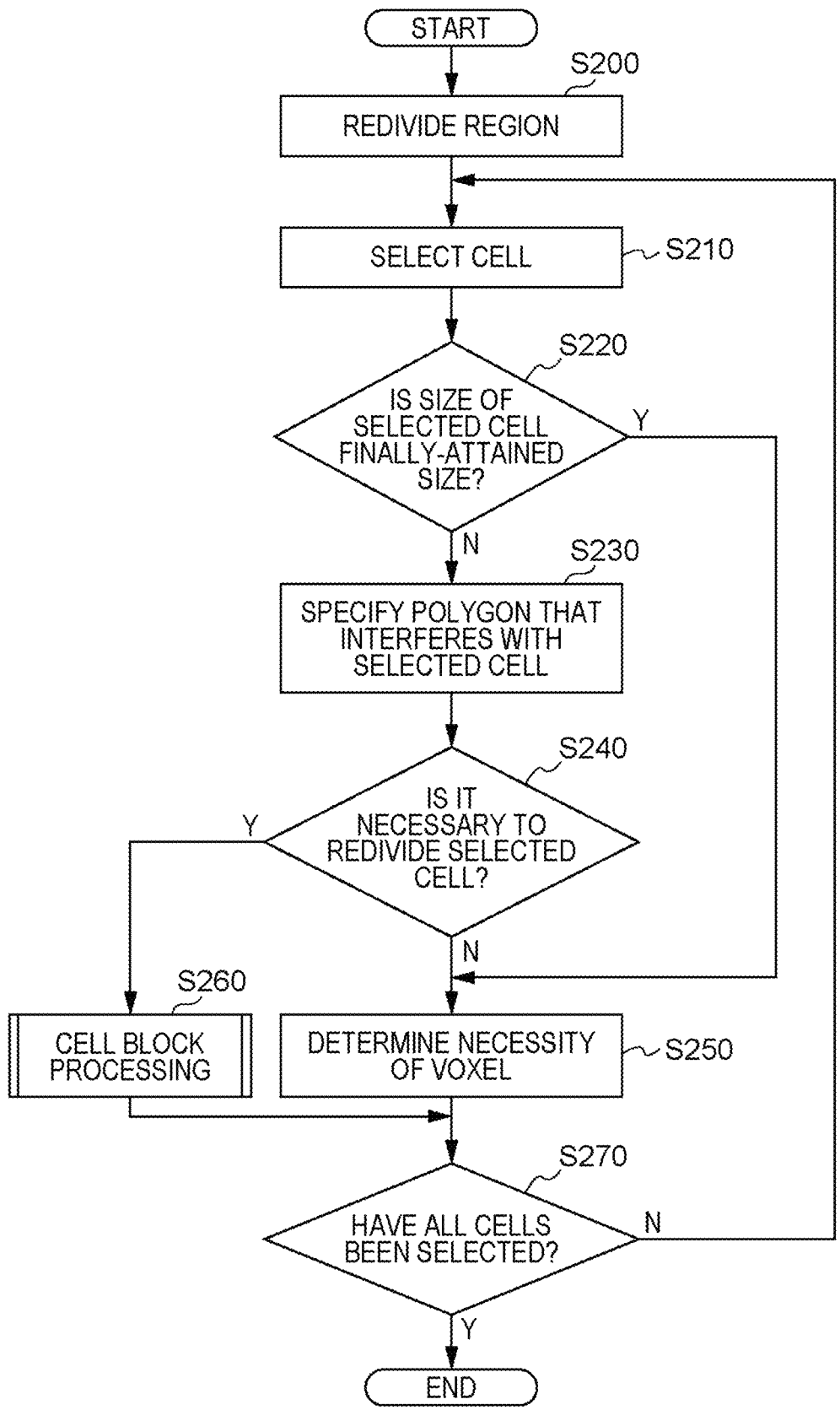
FIG. 14 is a flowchart illustrating an example of a flow of cell block processing.

FIG. 14 is a flowchart illustrating an example of a flow of the cell block processing in step S120 of FIG. 13.

Hereinafter, for convenience of description, a region 8 before division is referred to as a "region 8", and a region 8 obtained by dividing a region 8 before division is referred to as a "cell 8" in order to distinguish these regions 8. Furthermore, a group of regions 8 obtained by dividing a region 8 is referred to as a cell block.

In a case where a region 8 is a target of the cell block processing, a property of a portion of the three-dimensional shape of the object 2 expressed by a polygon 4 that interferes with the region 8 cannot be reproduced by a size of the region 8. Therefore, in step S200, the CPU 11 divides the region 8 into plural cells 8 of a predetermined second-division size. Step S200 is an example of processing for dividing a region 8.

In step S210, the CPU 11 selects any one of the plural cells 8 obtained in step S200. For convenience of description, the cell 8 selected in step S210 is referred to as a "selected cell 8".

In step S220, the CPU 11 determines whether or not a size of the selected cell 8 has reached a predetermined finally-attained size. Note that a state where the size of the cell 8 has reached the finally-attained size is a state where the size of the cell 8 has become equal to or less than the finally-attained size.

In a case where the size of the selected cell 8 has reached the finally-attained size, a property of a portion of the three-dimensional shape of the object 2 expressed by the selected cell 8 can be reproduced by the current size of the selected cell 8. Therefore, the CPU 11 proceeds to step S250 without performing processing in step S230 for specifying a polygon 4 that interferes with the selected cell 8 and processing in step S240 for determining whether or not it is necessary to redivide the selected cell 8. In a case where it is unnecessary to redivide the selected cell 8, information on a polygon 4 that interferes with the selected cell 8, which is information used for determination of redivision, becomes unnecessary. Therefore, the CPU 11 may delete information on a correspondence between an index number of the selected cell 8 and index numbers of all polygons 4 that interfere with the selected cell 8 from the RAM 13 to increase a space of the RAM 13 before proceeding to step S250. Furthermore, the CPU 11 may release a storage region in the RAM 13 reserved for redivision of the selected cell 8 before proceeding to step S250.

In step S250, the same processing as the processing in step S110 of FIG. 13 is performed. Specifically, it is determined whether or not to dispose a voxel 6 in the selected cell 8, and in a case where it is determined that it is necessary to dispose a voxel 6, a voxel 6 is disposed in the selected cell 8. The various aspects concerning the processing for disposing a voxel 6 described in step S110 are also applied to step S250. Step S250 is an example of processing for disposing a voxel 6 in a cell 8.

Meanwhile, in a case where it is determined in the determining process in step S220 that the size of the selected cell 8 has not reached the finally-attained size, the CPU 11 proceeds to step S230.

In step S230, the CPU 11 specifies a polygon 4 that interferes with the selected cell 8. Since the selected cell 8 is obtained by dividing the region 8, a polygon 4 that interferes with the selected cell 8 is naturally included in polygons 4 that interfere with the region 8. Therefore, the CPU 11 need just specify a polygon 4 that interferes with the selected cell 8 not from among all polygons 4 that express the contour of the object 2 but from among polygons 4 that interfere with the region 8 by using the method described in step S20 of FIG. 5.

Specifically, among the polygons 4 that interfere with the region 8, the CPU 11 need just associate, with an index number of the selected cell 8, an index number of a polygon 4 whose distance from the reference point Q of the selected cell 8 is equal to or less than the threshold value th as a polygon 4 that interferes with the selected cell 8.

Note that an interference condition concerning interference of a polygon 4 at one level of division may be milder or severer than that at a previous level by changing a value of the threshold value th or a range of the collision detection between the polygon 4 and the selected cell 8 from one level to another. Furthermore, a polygon 4 that interferes with the selected cell 8 may be specified by using an interference condition different from an interference condition at a previous level. For example, at one level, a polygon 4 that interferes with the selected cell 8 may be determined on the basis of a relationship between a distance from the reference point Q of the selected cell 8 to a polygon 4 and the threshold value th, and at a next level, a polygon 4 that interferes with the selected cell 8 may be determined by collision detection between the selected cell 8 and a polygon 4. As described above, step S230 is an example of processing for specifying a polygon 4 that interferes with a cell 8.

In step S240, the CPU 11 determines whether or not it is necessary to further divide the selected cell 8.

The method described in step S100 of FIG. 13 is used to determine whether or not it is necessary to redivide the selected cell 8. In this case, a division condition for determining whether or not it is necessary to redivide the selected cell 8 may be milder or severer than that at a previous level, for example, by changing a value of the threshold value $\sigma_{th}$ to be compared with variance $\sigma^2$ of normal vectors of polygons 4 that interfere with the selected cell 8 from one level to another. Furthermore, an allowable range to be compared with a variation in attribute value of an attribute of a polygon 4 or a three-dimensional space in a range corresponding to the selected cell 8 may be changed from one level of division to another. Furthermore, a division condition may be changed from one level of division to another or the number of division conditions used for determining whether or not it is necessary to redivide the selected cell 8 may be increased or decreased.

In a case where it is determined that it is unnecessary to redivide the selected cell 8, step S250 described above is performed, in which the CPU 11 disposes a voxel 6 in the selected cell 8 determined as needing a voxel 6.

Note that the CPU 11 may change a criterion used to determine whether or not to dispose a voxel 6 in the selected cell 8 from one level of division to another.

Meanwhile, in a case where it is determined that it is necessary to redivide the selected cell 8, the CPU 11 proceeds to step S260.

In step S260, the CPU 11 performs the cell block processing illustrated in FIG. 14. That is, the CPU 11 performs recursive processing for recursively performing the cell block processing starting from the processing in step S200 of FIG. 14 by regarding the selected cell 8 as a new region 8.

In a case where a level of division of the three-dimensional space before execution of step S260 is an M-th level, division of the three-dimensional space at an (M+1) level is performed in the cell block processing in step S260. "M" represents an integer of 1 or more.

In the recursive processing of the cell block processing, the "initial-division size" and the "second-division size" in step S200 become an "M-th division size" and an "(M+1)th division size", respectively. The recursive processing of the cell block processing is performed until it is determined for all selected cells 8 that redivision is unnecessary.

In a case where the processing in step S250 and the processing in step S260 are finished, step S270 is performed.

In S270, the CPU 11 determines whether or not all cells 8 obtained by dividing the region 8 in step S200 have been selected in step S210. In a case where there is a cell 8 that has not been selected yet, step S210 is performed, in which the CPU 11 selects any one of cells that have not been selected yet. That is, the processing in steps S210 to S260 are repeatedly performed until a voxel 6 is disposed in each cell 8 determined as needing a voxel 6 without performing further redivision or until each cell 8 is redivided by recursively calling up the cell block processing until it is determined that redivision of the cell 8 is unnecessary anymore and a voxel 6 is disposed in each cell 6 obtained by the redivision in accordance with a result of determining necessity of a voxel 6.

In this case, the CPU 11 may display a result of disposing a voxel 6 in cells 8 determined as needing a voxel 6 every time the cell block processing is recursively performed. A process through which the three-dimensional shape of the object 2 is constituted gradually from large voxels 6 to small voxels 6 every time the cell block processing is recursively called up is sequentially displayed on the display 18.

For example, in a case where the finally-attained size of the region 8 is not set in advance or in a case where it is found in advance that the number of levels of division and the number of regions 8 to be divided are larger than a standard, displaying the three-dimensional shape of the object 2 constituted by voxels 6 in steps at respective levels makes a user feel as if a waiting time to end of the processing for dividing the three-dimensional space is shorter than a case where a division result is displayed after the processing for dividing the three-dimensional space is finished.

In a case where it is determined in the determining process in step S270 that all of the cells obtained by dividing the region 8 in step S200 have been selected in step S210, the cell block processing illustrated in FIG. 14 is finished.

Note that it has been determined that a cell 8 whose size has reached the finally-attained size is not redivided anymore. Therefore, the CPU 11 may determine whether or not the size of the cell 8 will reach the finally-attained size at a next level of division in the cell block processing illustrated in FIG. 14 at a level of division previous to the level at which the size of the cell 8 will reach the finally-attained size, and in a case where it is determined that the size of the cell 8 will reach the finally-attained size, perform the cell block processing in step S260, for example, by omitting the processing in steps S230 and S240 of FIG. 14 so that a processing time of the processing for dividing the three-dimensional space is shortened.

Although the cells 8 are sequentially selected and it is determined whether or not it is necessary to redivide a selected cell 8 in the example of the cell block processing illustrated in FIG. 14, the processing in step S270 may be deleted and as many processes as the number of obtained cells 8 may be generated instead of selecting a cell 8 in step S210. In each of the processes, the processing in steps S220 to S260 is performed. The CPU 11 inputs the cells 8 in the respective processes so that the processing in steps S220 to S260 including the cell block processing recursively called up in step S260 is performed for each cell 8 in parallel.

Figure 15:
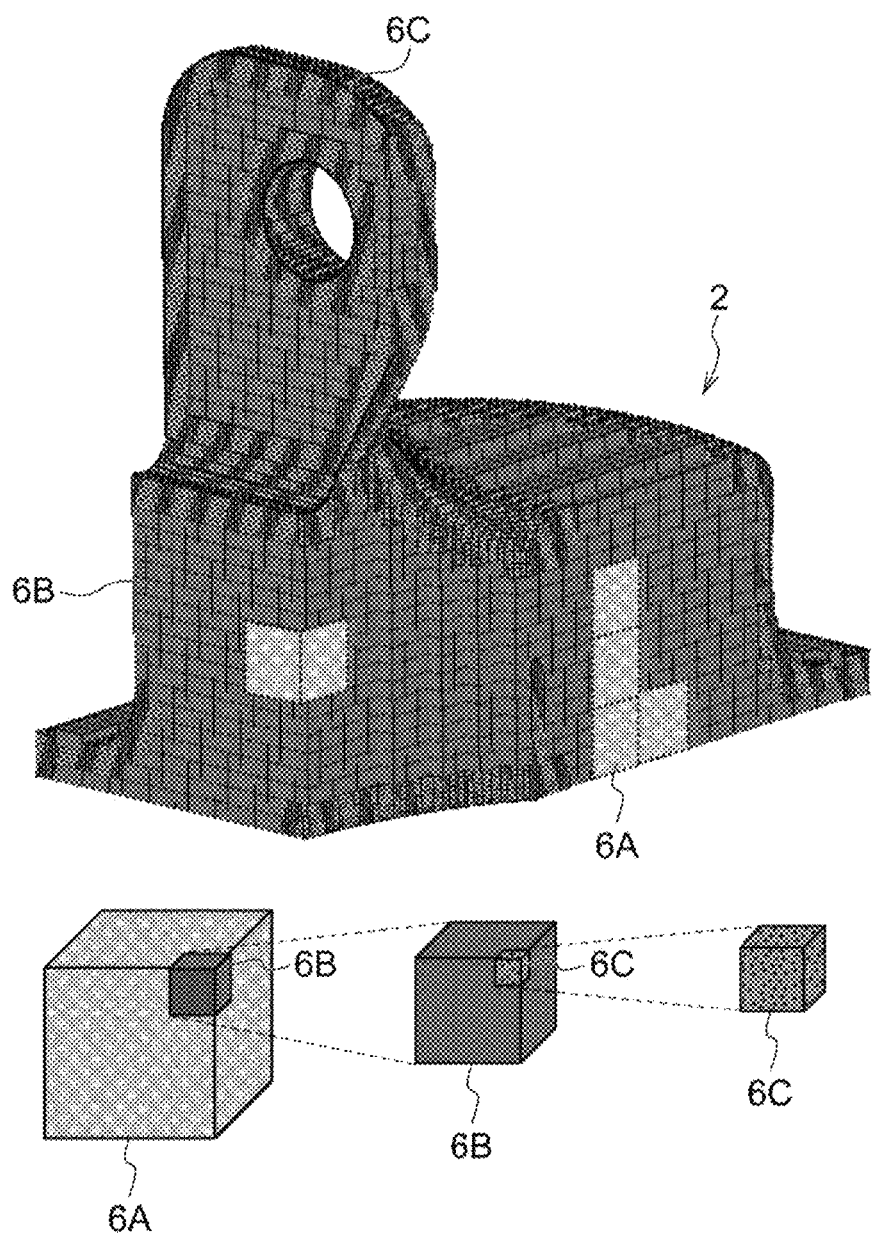
FIG. 15 illustrates an example of a three-dimensional shape of the object constituted by voxels of three kinds of sizes.
Figure 16:
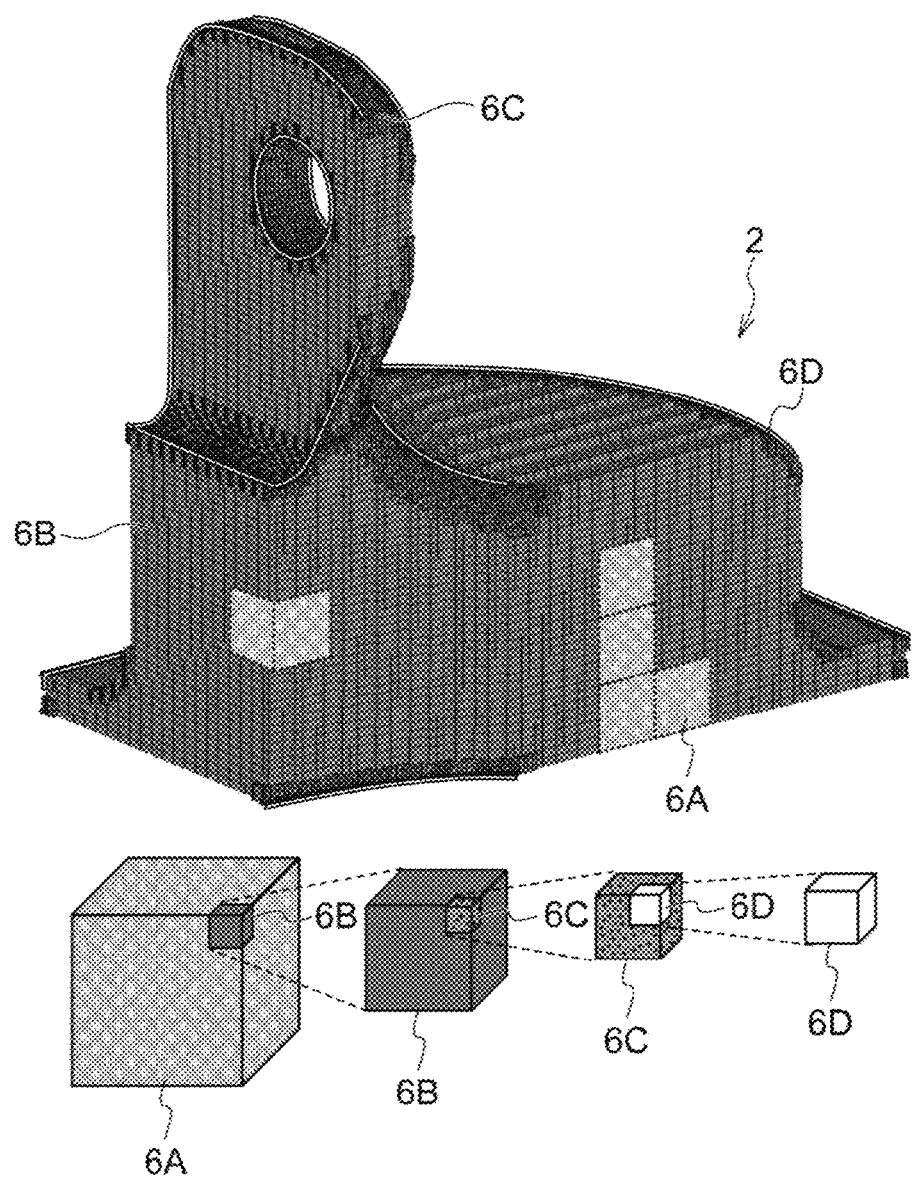
FIG. 16 illustrates an example of a three-dimensional shape of the object constituted by voxels of four kinds of sizes.

FIGS. 15 and 16 illustrate an example of a result of execution of the processing for dividing the three-dimensional space illustrated in FIG. 5. In FIGS. 15 and 16, the three-dimensional shapes of the object 2 at the same positions as the object 2 illustrated in FIG. 4 are expressed by voxels 6.

FIG. 15 illustrates an example of the object 2 constituted by voxels 6 of three kinds of sizes, specifically, voxels 6A, which are cubes 3.2 mm on a side corresponding to the initial-division size, voxels 6B, which are cubes 0.8 mm on a side corresponding to the second-division size, and voxels 6C, which are cubes 0.2 mm on a side corresponding to the third-division size, as a result of three levels of division of the object 2.

FIG. 16 illustrates an example of the object 2 constituted by voxels 6 of four kinds of sizes, specifically, voxels 6A, which are cubes 3.2 mm on a side corresponding to the initial-division size, voxels 6B, which are cubes 0.8 mm on a side corresponding to the second-division size, voxels 6C, which are cubes 0.2 mm on a side corresponding to the third-division size, and voxels 6D, which are cubes 0.05 mm on a side corresponding to the fourth-division size, as a result of four levels of division of the object 2.

For example, the sizes of the voxels 6 that constitute the object 2 are changed as illustrated in FIGS. 15 and 16, for example, by changing at least one of various conditions that influence sizes of the regions 8 such as the finally-attained size of the regions 8, the number of levels of division of the three-dimensional space, sizes into which the regions 8 are divided, an interference condition used to determine whether or not a polygon 4 interferes with a region 8, and a division condition used to determine whether or not it is necessary to redivide a region 8. Therefore, by setting the various conditions that influence sizes of the regions 8 in accordance with properties at respective portions of the three-dimensional shape of the object 2, sizes of the regions 8 including the respective portions are set to sizes necessary for reproduction of the properties of the object 2 at the respective portions.

In the processing for redividing a region 8 illustrated in FIG. 4, the CPU 11 determines necessity of a voxel 6 in the region 8 in a case where it is determined that it is unnecessary to redivide the region 8. However, a timing at which necessity of a voxel 6 is determined is not limited to a timing after it is determined that it is unnecessary to divide the region 8.

For example, it is more likely that a region 8 determined as needing redivision corresponds to a portion expressing the contour of the object 2 than a region 8 determined as not needing redivision. Accordingly, the CPU 11 may determine that a voxel 6 is disposed in a region 8 determined as needing redivision. Furthermore, the CPU 11 may determine whether or not to dispose a voxel 6 in a region 8 determined as needing redivision in accordance with the number of cells 8 determined as needing a voxel 6 among cells 8 obtained by redividing the region 8 instead of promptly determining that a voxel 6 is disposed in the region 8 determined as needing redivision. Specifically, the CPU 11 may determine that a voxel 6 is disposed in a region 8 in a case where the number of cells 8 determined as needing a voxel 6 among cells 8 obtained by dividing the region 8 exceeds a reference value or in a case where a ratio of cells 8 determined as needing a voxel 6 to cells 8 obtained by dividing the region 8 exceeds a reference ratio.

Furthermore, for example, the CPU 11 may determine that a voxel 6 is unnecessary in all regions 8 whose level of division is a predetermined level or lower and may determine necessity of a voxel 6 for regions 8 whose level of division is higher than the predetermined level.

Although whether or not it is necessary to redivide a region 8 is determined only on the basis of a state of the individual region 8 in step S100 of FIG. 13 and step 240 of FIG. 14, there are cases where it is better to determine whether or not it is necessary to redivide a region 8 on the basis of continuity concerning division with other regions 8.

For example, in a case where only a specific region 8 is redivided to a tenth level although adjacent regions 8B adjacent to the specific region 8 are determined as not needing redivision at the second level, it is likely that noise that influences determination of redivision is superimposed on the specific region 8. Therefore, the CPU 11 may put a restriction such as limiting the level of division of the specific region 8 to an allowable level set equal to or larger than a maximum one of levels of division of the adjacent regions 8B in a case where the level of division of the specific region 8 exceeds the allowable level even in a case where the specific region 8 is determined as needing redivision.

Although a region 8 is redivided in a case where a division condition is met in the processing for dividing the three-dimensional space illustrated in FIG. 5, the CPU 11 may stop redivision of the region 8 in a case where at least one of a state of a polygon 4 that interferes with a region 8, a state of the region 8, and a state of the polygon 4 and the region 8 meet a predetermined redivision stop condition even in a case where the region 8 meets the division condition.

For example, the CPU 11 may determine that the redivision stop condition is met and stop redivision of a region 8 in a case where various kinds of information such as curvature of the polygon 4 that interferes with the region 8, a way in which the polygon 4 that interferes with the region 8 and the region 8 intersect each other, an angle at which adjacent polygons are connected, and continuity of attributes with an adjacent polygon 4 are set as attributes of a voxel 6 disposed in the region 8 and a polygon 4 that interferes with the region 8 in which the voxel 6 is disposed can be reproduced from the attributes of the voxel 6. Furthermore, the CPU 11 may determine that the redivision stop condition is met and stop redivision of a region 8 in a case where a specific error concerning connection between polygons 4 such as inversion or discontinuity of polygons 4 is detected.

For example, in a case where a voxel 6 is disposed in a region 8 corresponding to a portion determined as being located inside the object 2 on the basis of a sign of an SDF, attention needs to be paid on the following situation.

Figure 17:
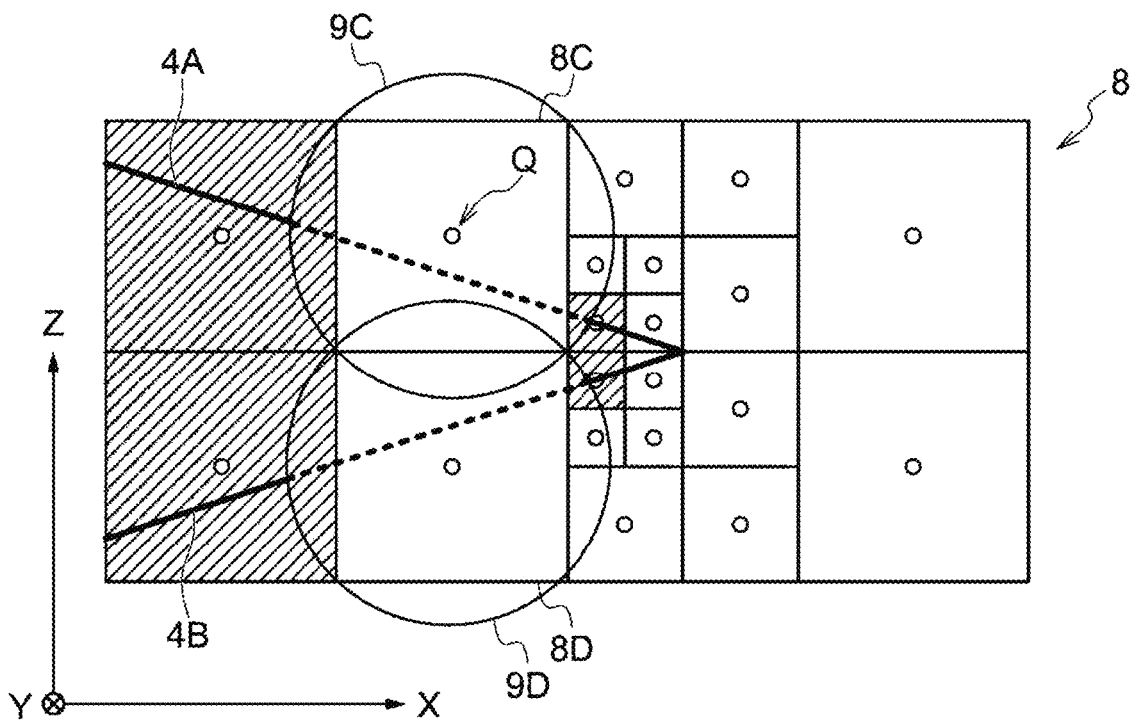
FIG. 17 illustrates an example of failure of reproduction of a three-dimensional shape.

FIG. 17 illustrates an example of plural regions 8 generated by dividing the three-dimensional space including flat-surface polygons 4A and 4B expressing the contour of the object 2 into cubes. For convenience of description, in FIG. 17 and FIGS. 18 and 19, which will be described later, a state of the three-dimensional space viewed from a direction orthogonal to the XZ plane is two-dimensionally illustrated.

The polygons 4A and 4B express a portion protruding from the object 2, and a closed region surrounded by the polygons 4A and 4B expresses an inside of the object 2, and the reference point Q is set at a center of each region 8. Among the regions 8, regions 8 shaded by the diagonal lines are regions in which a voxel 6 is disposed.

A sphere 9C is a circumscribing sphere of a region 8C and has a center at the reference point Q of the region 8C and a radius set to the threshold value th expressed by the equation (1). The sphere 9C is an interference range of the region 8C, and a range of the polygon 4A that interferes with the sphere 9C is indicated by the dotted line. Similarly, a sphere 9D is a circumscribing sphere of a region 8D and has a center at the reference point Q of the region 8D and a radius set to the threshold value th expressed by the equation (1). The sphere 9D is an interference range of the region 8D, and a range of the polygon 4B that interferes with the sphere 9D is indicated by the dotted line.

In a case where the redividing processing illustrated in FIG. 13 is performed on the region 8C in such a situation, the region 8C is determined as corresponding to a flat surface of the contour of the object 2 in the determining processing in step S100 since only the polygon 4A interferes with the sphere 9C. It is therefore determined that it is unnecessary to redivide the region 8C, and step S110 is performed.

In step S110, no voxel 6 is disposed in the region 8C since the reference point Q of the region 8C is not included in the inside of the object 2 and a sign of an SDF of the region 8C is minus.

Figure 18:
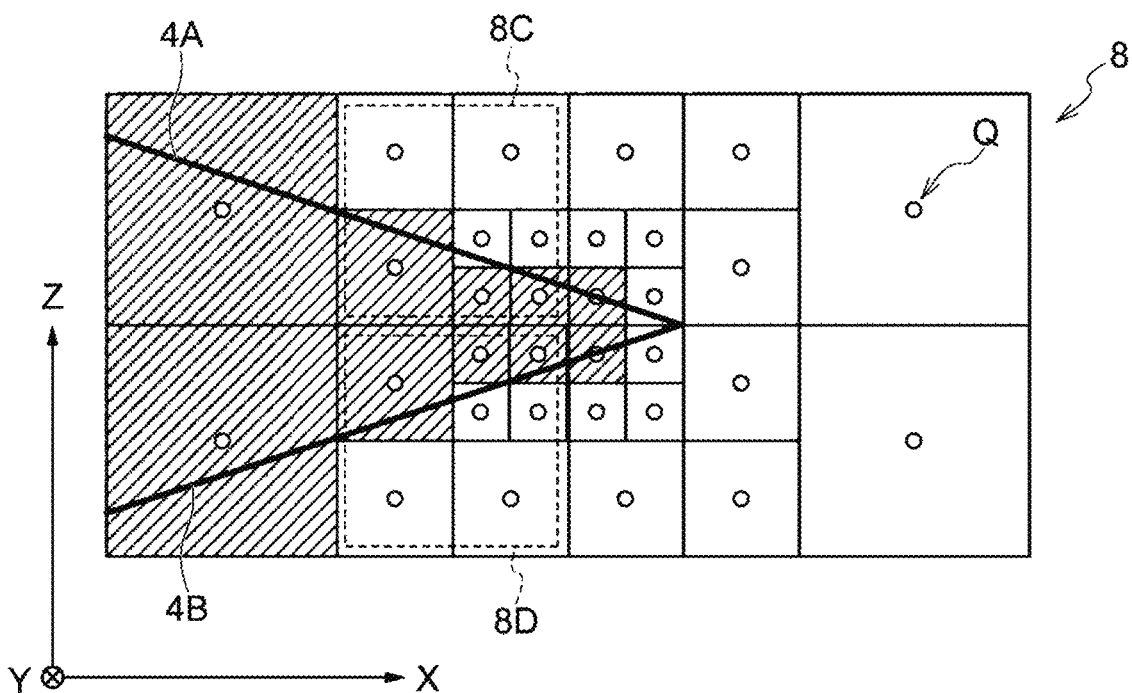
FIG. 18 illustrates an example of reproduction of a three-dimensional shape of a portion protruding from the object.

Although the region 8C should be redivided and a voxel 6 should be disposed in regions 8 corresponding to the closed region surrounded by the polygons 4A and 4B so as to approach the three-dimensional shape of the object 2 as illustrated in FIG. 18, no voxel 6 is disposed in the region 8C and therefore the three-dimensional shape like the one illustrated in FIG. 18 cannot be reproduced as illustrated in FIG. 17. The same also applies to the region 8D.

Such a situation occurs in a case where a polygon 4 passes between reference points Q of adjacent regions 8. Therefore, the CPU 11 sets an interference range set for a reference point Q of a region 8 to be divided so that the interference range includes a reference point Q of a region 8 adjacent to the region 8 to be divided and specifies a polygon 4 that interferes with the set interference range as a polygon 4 that interferes with the region 8 to be divided.

Figure 19:
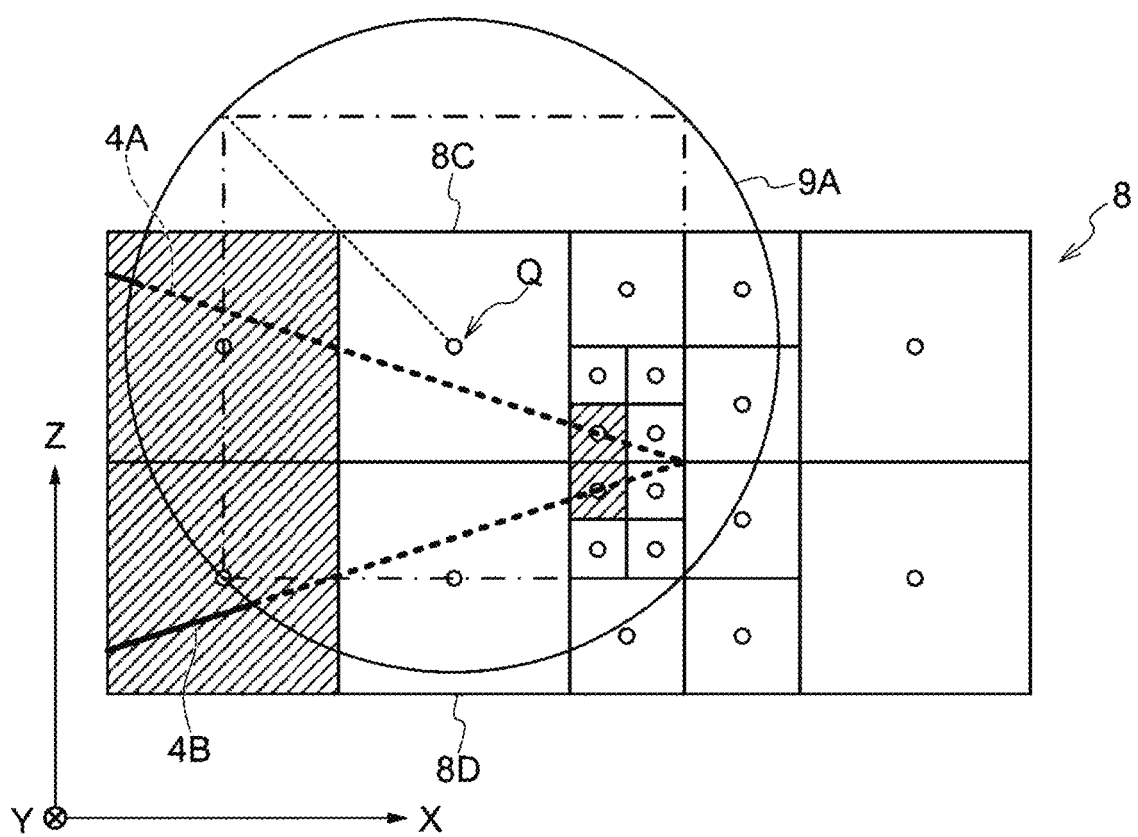
FIG. 19 illustrates an example of an interference range used in a case where a three-dimensional shape of a portion protruding from the object is reproduced.

FIG. 19 illustrates an example of a case where a range of a sphere 9A including the reference point Q of the region 8D is set as an interference range of the region 8C illustrated in FIG. 17. In the example of FIG. 19, a threshold value th defined by the following equation (2) is used to set the interference range.

$$th = \sqrt{\phantom{x}}(Dx^2 + Dy^2 + Dz^2) * (0.5 + \text{Ratio}) \qquad (2)$$

In the equation (2), Ratio represents an adjustment ratio for adjusting an interference range expressed by the threshold value th. Although the CPU 11 sets Ratio to 0.5 so that the interference range of the region 8C includes the reference point Q of the region 8D adjacent to the region 8C in the example of FIG. 19, Ratio need just be set in accordance with a distance between reference points Q of adjacent regions 8.

By enlarging the interference range of the region 8C as illustrated in FIG. 19, two polygons 4A and 4B interfere with the region 8C, and variance $\sigma^2$ of normal vectors of the polygons 4A and 4B exceeds the threshold value $\sigma_{th}^2$. As a result, it is determined that the polygons 4A and 4B that interfere with the region 8C express a portion other than a flat surface of the object 2. Therefore, the CPU 11 determines that it is necessary to redivide the region 8C. Similarly, in a case where an interference range similar to that of the region 8C according to the equation (2) is set as an interference range of the region 8D, the CPU 11 determines that it is necessary to redivide the region 8D.

Therefore, the regions 8C and 8D are redivided as illustrated in FIG. 18, and a voxel 6 is disposed in regions 8 corresponding to the closed region surrounded by the polygons 4A and 4B.

Although a method for displaying the three-dimensional shape of the object 2 constituted by voxels 6 in steps every time the cell block processing in step S120 of FIG. 13 is recursively performed has been already described, such a method for displaying the object 2 constituted by voxels 6 in steps may also be applied to Level of Detail (LOD) processing of the object 2.

For example, while the position of the object 2 constituted by voxels 6 is being moved on the display 18 of the computer 10, the three-dimensional shape of the object 2 is displayed on the basis of a result concerning a way in which voxels 6 are disposed in regions 8 of the initial-division size, and after this moving operation is finished, the three-dimensional shape of the object 2 is displayed on the basis of a finally obtained result concerning a way in which voxels 6 are disposed at the final level at which the size of regions 8 has reached the finally-attained size.

This allows the computer 10 to draw the object 2 faster and perform various kinds of processing faster than a case where the three-dimensional shape of the object 2 is always displayed on the basis of a finally obtained result concerning a way in which voxels 6 are disposed irrespective of whether or not some sort of operation is being performed on the object 2.

Furthermore, in a case where an attribute value of a specific attribute is associated with a region 8, the CPU 11 may interpolate the attribute value associated with the region 8, for example, on the basis of an attribute value of the specific attribute associated with a region 8 from which the region 8 was obtained or a cell 8 into which the region 8 is redivided.

For example, in a case where the specific region 8 has a three-level hierarchical structure expressed by parent, child, and grandchild such as an M-th level, an (M+1)th level, and an (M+2)th level, the CPU 11 does not associate an attribute value with the parent region 8 and associates an attribute value with the child and grandchild regions 8. In a case where an attribute value of the specific attribute is requested for the parent region 8, the attribute value of the specific attribute of the parent region 8 may be set by using a basic statistic value such as an average or a median of the attribute values of the specific attribute associated with the child and grandchild regions 8.

Conversely, in a case where a region 8 is not divided to the child and grandchild levels and an attribute value of a specific attribute is requested for a specific portion of the region 8 that corresponds to a range obtained if the region 8 is divided to the child and grandchild levels, the CPU 11 may use an attribute value of the specific attribute associated with the parent region 8 as an attribute value of the specific portion of the region 8 while regarding that the attribute value of the specific attribute associated with the parent region 8 is associated with the whole parent region 8.

Although an aspect of the three-dimensional shape data processing apparatus 1 has been described by using the embodiment, the disclosed aspect of the processing apparatus 1 is an example, and the aspect of the processing apparatus 1 is not limited to the scope described in the embodiment. The embodiment can be changed or modified in various ways without departing from the spirit of the present disclosure, and the changes or modifications are also encompassed within the technical scope of the disclosure. For example, the order of the three-dimensional space dividing processing, the redividing processing, and the cell block processing illustrated in FIGS. 5, 13, and 14, respectively may be changed without departing from the spirit of the present disclosure.

In the present disclosure, a case where the three-dimensional space dividing processing, the redividing processing, and the cell block processing are realized by software has been described as an example. However, processing equivalent to the flowcharts illustrated in FIGS. 5, 13, and 14 may be performed by hardware such as an Application Specific Integrated Circuit (ASIC), a Field Programmable Gate Array (FPGA), or a Programmable Logic Device (PLD). In this case, the processing can be performed faster than the case where the three-dimensional space dividing processing, the redividing processing, and the cell block processing are realized by software.

As described above, the CPU 11 of the processing apparatus 1 may be replaced by a processor dedicated for specific processing such as an ASIC, an FPGA, a PLD, a Graphics Processing Unit (GPU), or a Floating Point Unit (FPU).

The processing of the processing apparatus 1 may be performed by a combination of two or more processors of the same kind or different kinds such as plural CPUs 11 or a combination of the CPU 11 and an FPGA instead of being performed by a single CPU 11. Furthermore, the processing of the processing apparatus 1 may be realized by cooperation with a processor that is provided outside a housing of the processing apparatus 1 and is physically apart from the processing apparatus 1.

Although an example in which the processing program is stored in the ROM 12 of the processing apparatus 1 has been described in the above embodiment, a place where the processing program is stored is not limited to the ROM 12. The processing program according to the present disclosure can be offered as a form recorded in a storage medium that can be read by the computer 10. For example, the processing program may be offered as a form recorded in an optical disc such as a Compact Disk Read Only Memory (CD-ROM) or a Digital Versatile Disk Read Only Memory (DVD-ROM). Alternatively, the processing program may be offered as a form recorded in a portable semiconductor memory such as a Universal Serial Bus (USB) memory or a memory card. The ROM 12, the non-volatile memory 14, a CD-ROM, a DVD-ROM, a USB, and a memory card are examples of a non-transitory storage medium.

Furthermore, the processing apparatus 1 may download the processing program from an external device through the communication unit 19 and cause the downloaded processing program to be stored, for example, in the non-volatile memory 14. In this case, the CPU 11 of the processing apparatus 1 performs the three-dimensional space dividing processing, the redividing processing, and the cell block processing by reading out, from the non-volatile memory 14, the processing program downloaded from the external device.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A three-dimensional shape data processing apparatus comprising:
a processor configured to
divide a three-dimensional space including a three-dimensional shape constituted by one or more forming surfaces, which are flat surfaces or curved surfaces or include both flat surfaces and curved surfaces, into a plurality of three-dimensional regions each having a predetermined size,
specify, for each of the three-dimensional regions, one or more of the forming surfaces that interfere(s) with the three-dimensional region, wherein the forming surface that is in contact with or included in an interference range of the three-dimensional region is specified as interfering with the three-dimensional region, and
redivide each of the three-dimensional regions until a size of the three-dimensional region reaches a size necessary for reproduction of a property of a portion of the three-dimensional shape expressed by one or more of the forming surfaces that interfere(s) with the three-dimensional region, wherein
the processor is configured to, in a case where a property variation in a range of the one or more of the forming surfaces that interfere(s) with the three-dimensional region falls within a predetermined allowable range, determine that the size of the three-dimensional region has reached the size necessary for reproduction of the property of the portion of the three-dimensional shape expressed by the one or more of the forming surfaces that interfere(s) with the three-dimensional region and stop redivision of the three-dimensional region, and wherein
the processor is configured to, in a case where the one or more of the forming surfaces that interfere(s) with the three-dimensional region constitute(s) a flat surface of the three-dimensional shape or in a case where there is no forming surface that interferes with the three-dimensional region, determine that the size of the three-dimensional region has reached the size necessary for reproduction of the property of the portion of the three-dimensional shape expressed by the one or more of the forming surfaces that interfere(s) with the three-dimensional region and stop redivision of the three-dimensional region, wherein the processor is configured to, in a case where variance of normal vectors of the one or more of the forming surfaces that interfere(s) with the three-dimensional region is equal to or less than a predetermined threshold value, consider that the one or more of the forming surfaces constitute(s) a flat surface of the three-dimensional shape.

2. The three-dimensional shape data processing apparatus according to claim 1, wherein the processor is configured to, in a case where at least one of a property concerning the forming surface(s), a property concerning the three-dimensional region, and properties concerning the forming surface(s) and the three-dimensional region meets a predetermined redivision stop condition, stop redivision of the three-dimensional region even in a situation where redivision of the three-dimensional region is necessary.

3. The three-dimensional shape data processing apparatus according to claim 1, wherein the processor is configured to, in a case where at least one of a property concerning the forming surface(s), a property concerning the three-dimensional region, and properties concerning the forming surface(s) and the three-dimensional region meets a predetermined redivision stop condition, stop redivision of the three-dimensional region even in a situation where redivision of the three-dimensional region is necessary.

4. The three-dimensional shape data processing apparatus according to claim 1, wherein the processor is configured to dispose a three-dimensional element in one or more of the three-dimensional regions that is(are) involved in reproduction of a property of the three-dimensional shape in accordance with positional relationships between the three-dimensional regions and the forming surfaces.

5. The three-dimensional shape data processing apparatus according to claim 4, wherein the processor is configured to dispose the three-dimensional element in one or more of the three-dimensional regions whose redivision has been stopped in a case where a reference point preset in the one or more of the three-dimensional regions whose redivision has been stopped is located inside the three-dimensional shape.

6. The three-dimensional shape data processing apparatus according to claim 4, wherein the processor is configured to perform recursive processing for recursively performing, for each of three-dimensional regions obtained by redividing the three-dimensional regions, the processing for specifying one or more of the forming surfaces that interfere(s) with the three-dimensional region and the processing for disposing the three-dimensional element in the three-dimensional region.

7. The three-dimensional shape data processing apparatus according to claim 6, wherein the processor is configured to, in a case where redivision of the three-dimensional regions is recursively performed, specify, for each three-dimensional regions obtained by redividing the three-dimensional regions, one or more of the forming surfaces that interfere(s) with the obtained three-dimensional region from among one or more of the forming surfaces that interfere(s) with the redivided three-dimensional region.

8. The three-dimensional shape data processing apparatus according to claim 6, wherein the processor is configured to display a result of the processing for disposing the three-dimensional element every time the recursive processing is performed.

9. The three-dimensional shape data processing apparatus according to claim 1, wherein the processor is configured to specify one or more of the forming surfaces that interfere(s) with each of the three-dimensional regions by sequentially selecting all of the forming surfaces that constitute the three-dimensional shape, setting, for each of the selected forming surfaces, any one of three-dimensional regions that interfere with the selected forming surface as a reference three-dimensional region, specifying whether or not each of adjacent three-dimensional regions adjacent to the reference three-dimensional region interferes with the selected forming surface, and repeatedly performing, until there is no adjacent three-dimensional region that interferes with the selected forming surface, processing for setting one or more of the adjacent three-dimensional region that interfere(s) with the selected forming surface as a new reference three-dimensional region and specifying whether or not each of adjacent three-dimensional regions adjacent to the new reference three-dimensional region except the adjacent three-dimensional regions whose interference state with the selected forming surface has been already found interferes with the selected forming surface.

10. The three-dimensional shape data processing apparatus according to claim 1, wherein the processor is configured to set an interference range for a reference point of each of the three-dimensional regions so that the interference range includes a reference point of an adjacent three-dimensional region and specify one or more of the forming surfaces that interfere(s) with the set interference range as one or more of the forming surfaces that interfere(s) with the three-dimensional region.

11. The three-dimensional shape data processing apparatus according to claim 1, wherein the processor is configured to associate, with each of the three-dimensional regions, an attribute value indicative of an attribute of at least one of the forming surface and a space related to the three-dimensional region.

12. The three-dimensional shape data processing apparatus according to claim 1, wherein the processor is configured to perform the processing for redividing the three-dimensional regions in respective processes performed in parallel.

13. A non-transitory computer readable medium storing a program causing a computer to execute a process for three-dimensional shape data processing, the process comprising:

dividing a three-dimensional space including a three-dimensional shape constituted by one or more forming surfaces, which are flat surfaces or curved surfaces or include both flat surfaces and curved surfaces, into a plurality of three-dimensional regions each having a predetermined size, specifying, for each of the three-dimensional regions, one or more of the forming surfaces that interfere(s) with the three-dimensional region, wherein the forming surface that is in contact with or included in an interference range of the three-dimensional region is specified as interfering with the three-dimensional region, and redividing each of the three-dimensional regions until a size of the three-dimensional region reaches a size necessary for reproduction of a property of a portion of the three-dimensional shape expressed by one or more of the forming surfaces that interfere(s) with the three-dimensional region, wherein in a case where a property variation in a range of the one or more of the forming surfaces that interfere(s) with the three-dimensional region falls within a predetermined allowable range, it is determined that the size of the three-dimensional region has reached the size necessary for reproduction of the property of the portion of the three-dimensional shape expressed by the one or more of the forming surfaces that interfere(s) with the three-dimensional region and redivision of the three-dimensional region is stopped, and wherein in a case where the one or more of the forming surfaces that interfere(s) with the three-dimensional region constitute(s) a flat surface of the three-dimensional shape or in a case where there is no forming surface that interferes with the three-dimensional region, it is determined that the size of the three-dimensional region has reached the size necessary for reproduction of the property of the portion of the three-dimensional shape expressed by the one or more of the forming surfaces that interfere(s) with the three-dimensional region and redivision of the three-dimensional region is stopped, wherein the processor is configured to, in a case where variance of normal vectors of the one or more of the forming surfaces that interfere(s) with the three-dimensional region is equal to or less than a predetermined threshold value, consider that the one or more of the forming surfaces constitute(s) a flat surface of the three-dimensional shape.

* * * * *